United States Patent
Jones

(10) Patent No.: US 10,569,748 B2
(45) Date of Patent: *Feb. 25, 2020

(54) JACK FOR ATV

(71) Applicant: Tuff Trail Gear, Inc., West Jordan, UT (US)

(72) Inventor: Todd L. Jones, West Jordan, UT (US)

(73) Assignee: TUFF TRAIL GEAR, INC., West Jordan, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/924,214

(22) Filed: Mar. 17, 2018

(65) Prior Publication Data

US 2018/0215353 A1 Aug. 2, 2018

Related U.S. Application Data

(63) Continuation of application No. 15/656,046, filed on Jul. 21, 2017, now Pat. No. 9,937,901, which is a continuation-in-part of application No. 15/448,192, filed on Mar. 2, 2017, now Pat. No. 9,776,840.

(60) Provisional application No. 62/302,736, filed on Mar. 2, 2016.

(51) Int. Cl.
*B66F 3/00* (2006.01)
*B60S 9/04* (2006.01)
*B60S 9/22* (2006.01)

(52) U.S. Cl.
CPC . *B60S 9/04* (2013.01); *B60S 9/22* (2013.01); *B66F 3/005* (2013.01)

(58) Field of Classification Search
CPC ...... B66F 1/00; B66F 1/02; B66F 3/00; B60S 9/00; B60S 9/10
See application file for complete search history.

(56) References Cited

U.S. PATENT DOCUMENTS

| | | | | |
|---|---|---|---|---|
| 3,106,382 A | * | 10/1963 | Georgi | B60D 1/66 254/419 |
| 3,182,957 A | | 5/1965 | Dalton | |
| 3,387,821 A | | 6/1968 | Saddler | |
| 3,595,527 A | | 7/1971 | Douglas | |
| 4,235,542 A | | 11/1980 | Paterik, Jr. | |
| 5,067,739 A | * | 11/1991 | Kuan | B62H 1/06 180/219 |
| 5,205,586 A | * | 4/1993 | Tallman | B60S 9/06 254/424 |
| 6,062,545 A | * | 5/2000 | Peavler | B60D 1/66 254/418 |
| 6,895,648 B1 | | 5/2005 | Willett | |
| 7,025,332 B2 | | 4/2006 | Rincoe | |
| 7,296,784 B2 | * | 11/2007 | Peter | B60S 9/12 254/418 |
| 8,348,241 B2 | | 1/2013 | Trowbridge et al. | |
| 8,783,660 B1 | * | 7/2014 | Riddle | B60S 11/00 254/418 |
| 8,910,924 B2 | | 12/2014 | Alanko | |
| 9,937,901 B2 | * | 4/2018 | Jones | B60S 9/04 |

(Continued)

*Primary Examiner* — Lee D Wilson
(74) *Attorney, Agent, or Firm* — Bateman IP

(57) ABSTRACT

An ATV jack may include a clamping engagement member and a leg which pivots which respect to the clamping engagement member a limited amount to enable the jack to lift and hold an ATV. The leg may telescope to allow the jack to be used at variable heights.

19 Claims, 18 Drawing Sheets

(56) References Cited

U.S. PATENT DOCUMENTS

| | | | |
|---|---|---|---|
| 2005/0189528 A1* | 9/2005 | Rincoe | B60S 9/04 254/424 |
| 2007/0221900 A1 | 9/2007 | Giralde | |
| 2009/0057633 A1 | 3/2009 | Beck et al. | |
| 2013/0334480 A1* | 12/2013 | Daniel | B60S 9/12 254/419 |
| 2015/0197220 A1 | 7/2015 | Lusty et al. | |
| 2017/0253470 A1* | 9/2017 | Jones | B60S 9/00 |
| 2017/0327092 A1* | 11/2017 | Jones | B60S 9/04 |

* cited by examiner

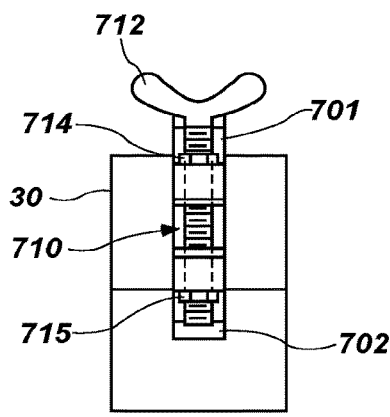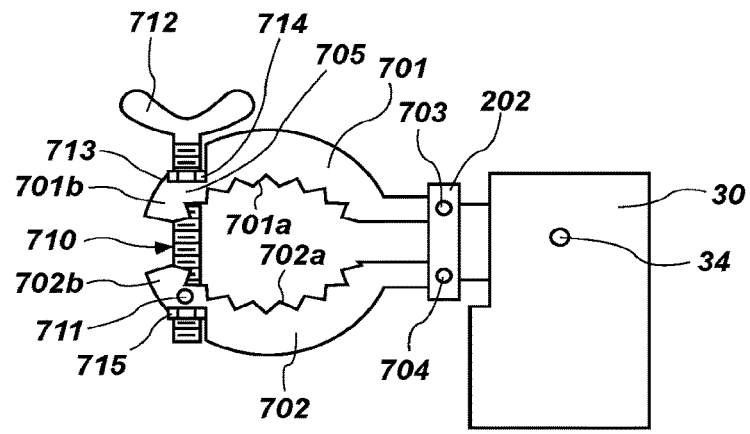
FIG. 37               FIG. 36
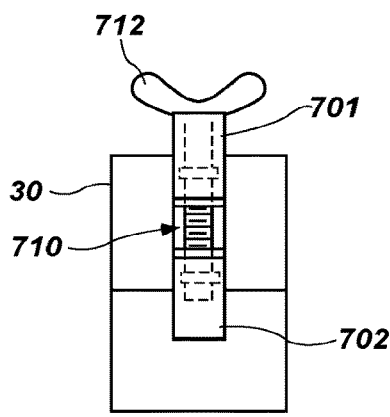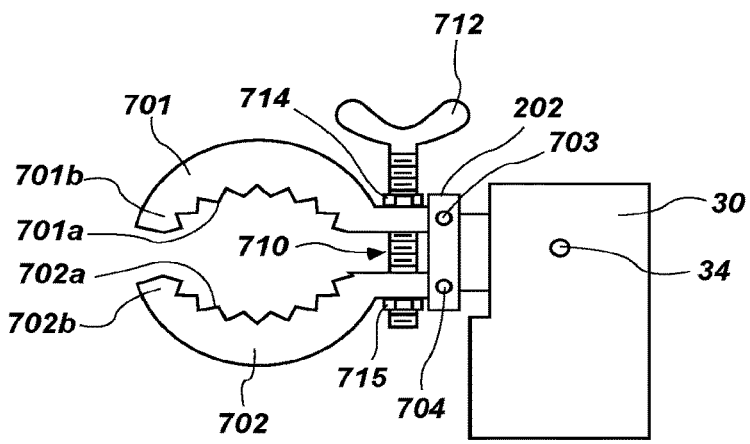
FIG. 39               FIG. 38

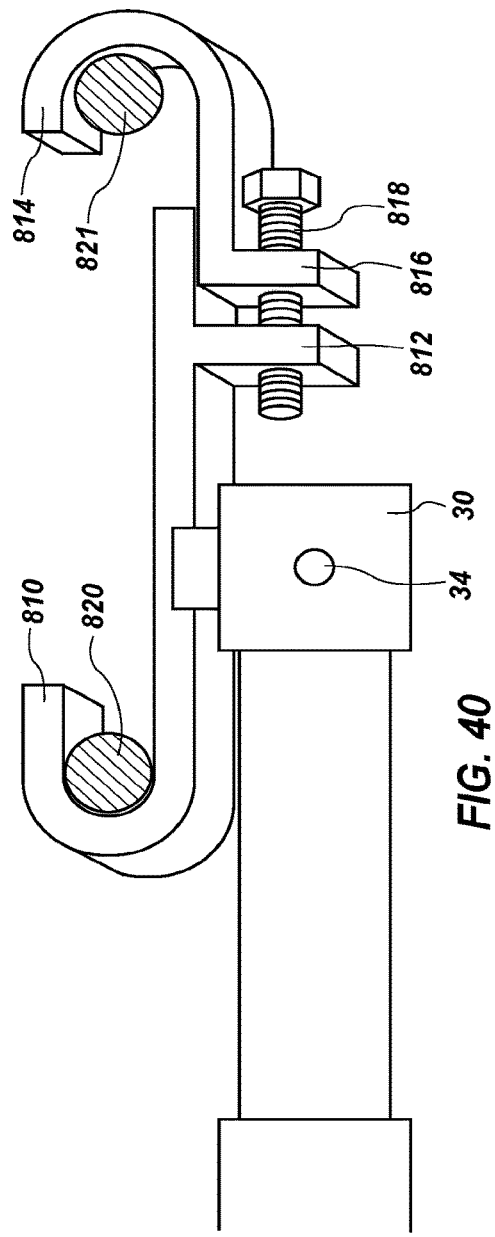
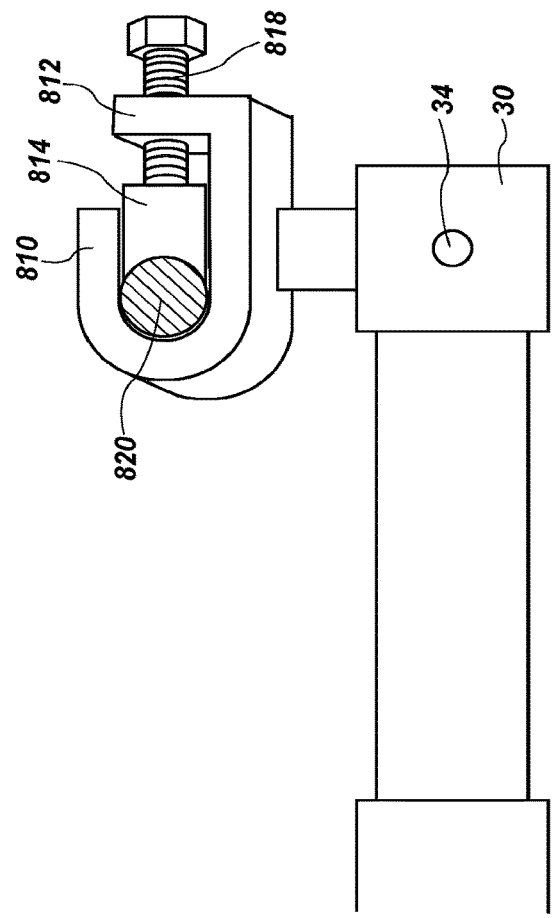

JACK FOR ATV

BACKGROUND

Field of the Invention

The present invention relates to a jack for use with a variety of all terrain, utility or off road vehicles. More particularly, the present invention leads to a jack which allows a tire to be quickly changed while keeping weight to a minimum.

Background

Conventional all terrain vehicles, such as four wheelers, side-by-sides or utility task vehicles (UTVs) and recreational off road vehicles (ROVs) are all popular vehicles used in a variety of environments. As used herein, the term "ATV" is used to include any of these vehicles.

ATVs are popular vehicles for a variety of reasons. Because the user can get on and off (or in and out) easily and the ATV can be cleaned more easily than an automobile, they are often used to perform work on farms and ranches, during which the vehicle may be exposed to mud, manure or other substances which may be difficult to clean out of a truck or other automobile. Likewise, ATVs are very popular because they allow the user to access areas which are more difficult to access with a conventional automobile. ATVs can travel on roads which are too rough for most cars, and are narrow enough to go on trails which are too small for pick-ups and most other four wheel drive vehicles.

Because ATVs travel on rough roads and other harsh environments, ATVs can suffer damages to their tires. For example, hitting a sharp rock may cause a tire to go flat. Automobiles are often equipped with a jack which allows the user to change a flat tire. The jack usually includes a screw mechanism which increases the height of the jack until it engages the frame of the automobile and lifts the tire off of the ground so that it may be changed. It can take several minutes of turning to lift the automobile sufficiently to enable the tire to be removed.

In an ATV the problem is exacerbated. First, ATVs have less room to carry a jack than an automobile. Moreover, because an ATV can travel on much rougher roads, there is a much greater variance in the potential height between the frame or suspension of the ATV and the road surface. For example, a typical automobile will have its frame between 12 and 18 inches from the ground. The undercarriage of an ATV typically rides higher over the road, and moreover, the ATV may be parked on rough or muddy ground where the center of the tire will need to be 24 inches or more above the surface directly thereunder to comfortably change the tire. Using a conventional screw jack would take considerable time to expand the jack to lift the tire off the ground to change the tire. Moreover, because the terrain might be very rough, the optimum spot to set the foot of the jack may not be directly beneath the ATV. A conventional jack may, when supporting the weight of a vehicle, be driven into soft or muddy ground, and thus be ineffective in lifting the vehicle or difficult to retrieve. Additionally, the size of the jack might be relatively large for use on an ATV.

Thus, there is a need for a jack which can be used with an ATV which is simple, quick, allows for flexibility in positioning, and is relatively compact.

SUMMARY OF THE INVENTION

The present invention provides an improved ATV jack, which includes an engagement member which can engage the frame or suspension system of an ATV and a leg which will lift the ATV. The engagement member may include an insert which engages a void or hole on the ATV and an extendable leg which rotates or pivots over a limited range of motion with respect to the insert to lift the ATV.

In one aspect, the present invention relates to a non-pneumatic crankless fulcrum ATV jack for removably mounting to an ATV suspension system, comprising:

a leg that is telescoping and adjustable in length and comprises two or more telescoping leg segments, wherein the leg is configured to extend in a pre-extended position prior to loading at a fixed length greater than the distance of the suspension system to the ground and sufficient to raise the tire off the ground when the leg is in a vertical position;

a clamping engagement member that is pivotally attached to the leg, wherein the clamping engagement member is configured to reversibly clamp to a support structure of the ATV suspension system; and a safety lock system configured to lock the clamping engagement member in place when the leg is vertical under the ATV, wherein a top portion of the leg comprises a flange having a single side opening configured to restrict the engagement member from pivoting and allowing movement of the leg substantially beyond vertical.

In some embodiments, the clamping engagement member comprises two opposing clamping jaws.

In other embodiments, the invention further comprises a locking bolt configured to lock the clamping jaws closed.

In one aspect, the present invention includes an ATV jack comprising an engagement member and a leg, the engagement member being pivotally attached to the leg.

In other embodiments, the leg comprises an engagement surface for limiting the rotation or pivoting of the engagement member in at least one direction.

In yet other embodiments, the leg is adjustable in length. For example, the leg may comprise two or more telescoping leg segments. In some embodiments, the leg member comprises an upper leg segment attached to the engagement member, at least one middle leg segment and a lower leg segment, and wherein at least one of the leg segments telescopes from one of the other leg segments.

In some embodiments, one or more leg segment may comprise a plurality of holes and the jack may further comprise a plurality of pins configured to insert into the plurality of holes, so as to permit adjustment of the length of the jack and fixing it at a desired length.

In some embodiments, the leg is attached to a base. In some embodiments, the base comprises a base plate. In other embodiments, the base plate comprises a flat plate. In other embodiments, the base comprises a pointed end. In yet other embodiments, the base has a rubber coating disposed thereon.

In another aspect, the jack of the present invention may further comprise a safety lock system comprising a radial flange disposed around and near a proximal end of the engagement member (near the pivot point on the leg) and a safety collar having an opening configured to fit over the engagement member between the radial flange and the leg, thereby preventing the engagement member from pivoting and locking the engagement member in place. In some embodiments, a top portion of the leg comprises a flange having a single side opening configured to restrict the engagement member from pivoting greater than about 45 degrees.

In another aspect, the jack of the present invention may comprise a second jack having an engagement member and a leg, the ATV jack system further comprising a brace for attaching the jacks together.

In another aspect, the present invention relates to a method for lifting an ATV having a suspension system using a non-pneumatic crankless fulcrum ATV jack, the method comprising:

providing an ATV jack having a clamping engagement member configured to reversibly clamp to a support structure of the ATV suspension system and a telescoping adjustable length leg with two or more telescoping leg segments comprising a top leg and bottom leg portion, wherein the top leg portion is pivotally attached to the clamping engagement member, wherein the leg is configured to extend in a pre-extended position prior to loading at a fixed length greater than the distance of the suspension system to the ground and sufficient to raise the tire off the ground when the leg is in a vertical position;

disposing the leg at a downward angle so that the bottom portion of the leg rests on the ground in the pre-extended position; and advancing the ATV toward the leg so that the leg moves toward vertical until the leg stops pivoting with respect to the engagement member;

wherein the jack further comprises a safety lock system configured to lock the engagement member in place when the leg is vertical under the ATV, and wherein a top portion of the leg comprises a flange having a single side opening configured to restrict the engagement member from pivoting and allowing movement of the leg substantially beyond vertical.

In other embodiments, the leg telescopes and wherein the method further comprises adjusting the leg's length prior to inserting the engagement member into the tube.

In other embodiments, the leg has a base attached thereto.

In other embodiments, the leg passes over vertical.

In other embodiments, advancing the ATV toward the leg loads the suspension system.

In yet other embodiments, the engagement member comprises a projection and the mating engagement member comprises a tube configured to receive the projection.

In another aspect, the present invention further includes an ATV bracket for receiving a jack and supporting an ATV lifted by the jack, comprising an elongate tube having an open end configured to receive a mating jack projection and a closed end configured to mount to a vehicle bolt, wherein the closed end comprises a hole configured to receive the vehicle bolt and retain the tube on the vehicle bolt.

BRIEF DESCRIPTION OF THE DRAWINGS

Various embodiments and features of and ATV jack are shown and described in reference to the following numbered drawings:

FIG. 36 shows a side view of a clamping bracket with a front screw clamping mechanism;

FIG. 37 shows a front view of the clamping bracket of FIG. 36;

FIG. 38 shows a side view of a clamping bracket with a rear screw clamping mechanism;

FIG. 39 shows a front view of the clamping bracket of FIG. 38;

FIG. 40 shows a side view of a clamping bracket used to clamp between two structures.

FIG. 41 shows a side view of a clamping bracket used to clamp a single structure;

Figure 1:
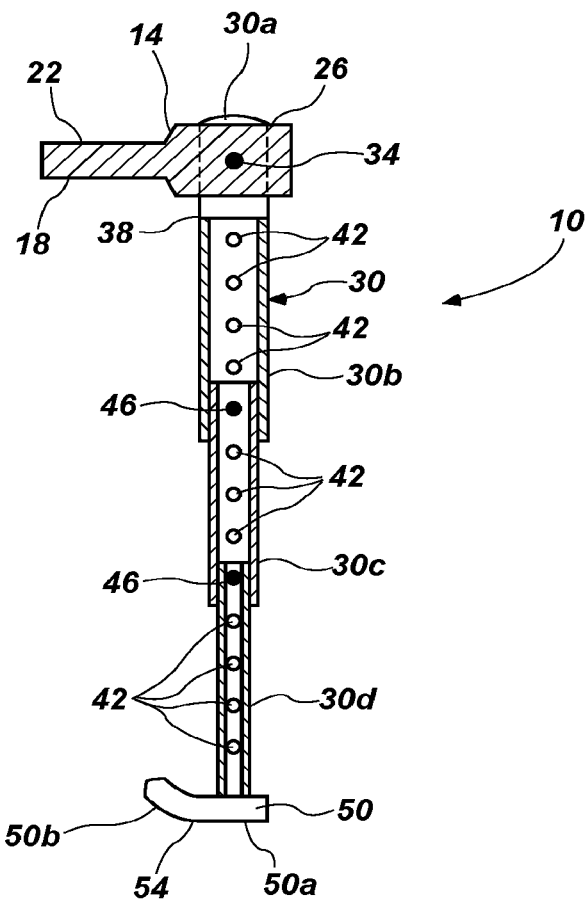
FIG. 1 shows a side, cross-sectional view of an ATV jack made in accordance with principles of the present disclosure.

It will be appreciated that the drawings are illustrative and not limiting of the scope of the invention which is defined by the appended claims. The embodiments shown accomplish various aspects of the invention. It is appreciated that it is not possible to clearly show each element and aspect of an invention in a single figure, and as such, multiple figures are presented to separately illustrate the various details of embodiments of ATV lift systems in greater clarity. Several aspects from different figures may be used in accordance with ATV jacks in a single structure. Similarly, not every embodiment need accomplish all advantages of various embodiments of ATV lift systems.

DETAILED DESCRIPTION

The invention and accompanying drawings will now be discussed in reference to the numerals provided therein so as to enable one skilled in the art to practice the present invention. The skilled artisan will understand, however, that the apparatuses, systems and methods described below can be practiced without employing these specific details, or that they can be used for purposes other than those described herein. Indeed, they can be modified and can be used in conjunction with products and techniques known to those of skill in the art in light of the present disclosure. The drawings and descriptions are intended to be exemplary of various aspects of the invention and are not intended to narrow the scope of the appended claims. Furthermore, it will be appreciated that the drawings may show aspects of the invention in isolation and the elements in one figure may be used in conjunction with elements shown in other figures.

Reference in the specification to "one configuration" "one embodiment," "a configuration" or "an embodiment" means that a particular feature, structure, or characteristic described in connection with the configuration is included in at least one configuration, but is not a requirement that such feature, structure or characteristic be present in any particular configuration unless expressly set forth in the claims as being present. The appearances of the phrase "in one configuration" in various places may not necessarily limit the inclusion of a particular element of the invention to a single configuration, rather the element may be included in other or all configurations discussed herein.

Furthermore, the described features, structures, or characteristics of configurations of the invention may be combined in any suitable manner in one or more configurations. In the following description, numerous specific details are provided, such as examples of products or manufacturing techniques that may be used, to provide a thorough understanding of configurations of the invention. One skilled in the relevant art will recognize, however, that configurations of the invention may be practiced without one or more of the specific details, or with other methods, components, materials, and so forth. In other instances, well-known structures, materials, or operations are not shown or described in detail to avoid obscuring aspects of the invention.

Before the present invention is disclosed and described in detail, it should be understood that the present disclosure is not limited to any particular structures, process steps, or materials discussed or disclosed herein, but is extended to include equivalents thereof as would be recognized by those of ordinarily skill in the relevant art. More specifically, the invention is defined by the terms set forth in the claims. It should also be understood that terminology contained herein is used for the purpose of describing particular aspects of the invention only and is not intended to limit the invention to the aspects or configurations shown unless expressly indicated as such. Likewise, the discussion of any particular aspect of the invention is not to be understood as a requirement that such aspect is required to be present apart from an express inclusion of the aspect in the claims.

It should also be noted that, as used in this specification and the appended claims, singular forms such as "a," "an," and "the" may include the plural unless the context clearly dictates otherwise. Thus, for example, reference to "a channel" may include one or more of such springs, and reference to "the backing" may include reference to one or more of such layers.

As used herein, the term "substantially" refers to the complete or nearly complete extent or degree of an action, characteristic, property, state, structure, item, or result to function as indicated. For example, an object, such as tubing, that is "substantially" enclosed would mean that the object is either completely enclosed or nearly completely enclosed. The exact allowable degree of deviation from absolute completeness may in some cases depend on the specific context, such that enclosing nearly all of the length of a piece of tubing would be substantially enclosed, even if the distal end of the structure enclosing the tubing had a slit or channel formed along a portion thereof. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it lacked a bottom.

As used herein, the term "about" is used to provide flexibility to a numerical range endpoint by providing that a given value may be "a little above" or "a little below" the endpoint while still accomplishing the function associated with the range.

As used herein, a plurality of items, structural elements, compositional elements, and/or materials may be presented in a common list for convenience. However, these lists should be construed as though each member of the list is individually identified as a separate and unique member.

Concentrations, amounts, proportions and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

The jack of the present invention generally includes an engagement member, a leg and a base. The engagement member is configured to mate with a mating engagement member mounted to an ATV. The leg may be adjustable to any desired length sufficient to lift the vehicle off the ground. The engagement member of the jack is mounted to the mating engagement member on the ATV, the leg is extended a distance away from the ATV with the base on the ground. By simply moving the ATV in a direction toward the base on the ground, the jack lifts the vehicle off the ground, where it can then be repaired or maintained. The jack of the present invention (which has been adjusted to a fixed length) thus lifts the ATV off the ground by means of the movement of the vehicle to essentially high-center one or more of the ATV wheels above and/or over the jack itself. Other advantages and safety features of the jack are described in greater detail below.

Turning now to FIG. 1 there is shown a side, cross-sectional view of an ATV jack, generally indicated at 10, made in accordance with principles of the present disclosure. The ATV jack 10 may include an engagement member 14, such as insert 18. As shown in FIG. 1, the insert includes a mating engagement member, such as a projection 22, which may be a solid piece of metal, a tube or piece of hollow steel or other suitably durable lightweight material, such as aluminum, carbon fiber, titanium, etc. that is capable of supporting the weight of an ATV or other vehicle.

Those familiar with ATVs will appreciate that the rear suspension system on some ATVs sold by Polaris Industries, Inc., Medina, Minn., USA, for example, includes a tube adjacent the juncture between one of the suspension arms and the shock absorber. The projection 22 may be sized to fit in that tube with little movement or play between the parts in the connection. However, a variety of sized and shaped projections could be used.

Moreover, it is further understood that the engagement member 14 and its mating engagement member may comprise any suitable cross-sectional geometry suitable to maintain the structural integrity of the system. For example, the cross-sectional geometry may be circular, oval, square, triangular, I-beam shaped or any other suitable shape. Similarly, it is understood that the engagement member and mating engagement member may be either male fitting or female fitting connectors. For example, the engagement member of the jack may be a male fitting projection and the mating engagement member of the bracket that is attached to the ATV may be a female fitting receiving tube. Conversely, the engagement member of the jack may be a female fitting receiving tube and the mating engagement member of the bracket that is attached to the ATV may be a male fitting projection. In addition, the mating of the engagement member 14 and its mating engagement member mounted to a bracket on the vehicle may be a simple sliding arrangement of the engagement member with the mating engagement member, or could alternatively comprise a threaded screw-like mating of the engagement member with the mating engagement member where the external surface of the projection and the internal surface of the tube having mating thread structures that allow the projection to be screwed into the tube. A threaded screw-like mating relationship would have the added safety advantage that the engagement member and mating engagement member would not inadvertently come apart during use and cause the vehicle to fall. Those skilled in the art will appreciate that other suitable connecting mechanisms may also be utilized.

The insert 18 may also include a base 26 which extends from the insert. The base may be formed integrally with the insert 18, or may be formed separately and then either welded or otherwise attached to the insert. While FIG. 1 shows both the insert and the base as being solid, it will be appreciated that one or both could be hollow provided that sufficiently strong materials are used to handle the weight associated with holding the wheel of an ATV above the ground.

The engagement member 14 is connected to a leg 30. This engagement member 14 and the leg may pivot or rotate with respect to one another. Thus, a pin 34 may, for example, engage the base 26 and a flange (FIG. 2) or similar structure at the top 30a of the leg 30. The leg 30 may also include an engagement surface 38 to limit the rotation of the engagement member 14 toward the leg in one direction as will be explained in additional detail below. Rotational degree or degree of swing of the leg 30 may be limited to, for example, about −10 degrees to 60 degrees from vertical with respect to the engagement member 14.

The leg 30 may in some embodiments be formed from a plurality of segments 30b, 30c, 30d to allow the leg to telescope to a needed height. Thus, the leg 30 may include an upper segment 30b, one or more middle segment 30c, and a lower segment 30d. Each of the segments may include a plurality of holes 42. Alternatively, one or more of the segments may have only a single hole, while other segments have a plurality of holes. By aligning holes 42 from two adjacent segments and inserting pins 46 to hold the sections relative each other, the height of the leg can quickly be adjusted to provide a desired height. Unlike a screw jack which can take several minutes and hundreds of turns to get to a desired height, the telescoping leg 30 can be adjusted to the desired height in a matter of seconds. Additionally the leg 30 allows considerable extension in a small package. A leg which is about 1 foot long when fully collapsed can be extended, for example, to 32 inches. If four segments are used, the leg can be extended to about 42 inches. A screw jack would have to be much larger to reach 42 inches tall and would take several minutes to fully deploy.

Disposed at the bottom of the lower segment 30d is a foot or base plate 50. The base plate 50 may be rigidly attached or pivotally attached to the lower section 30d. The base plate may, in some embodiments, include a first generally flat portion 50a and a second, upwardly rounded portion 50b. The underside of the base plate 50 may be coated with rubber or other high friction surface 54 to encourage a good grip with the surface on which the jack 10 is being used. The rounded second portion 50b has been shown to assist the base plate with gripping smooth surfaces, such as polished concrete. The upwardly rounded portion is useful when the base plate 50 is rigidly attached to the lower segment 30d.

Figure 2:
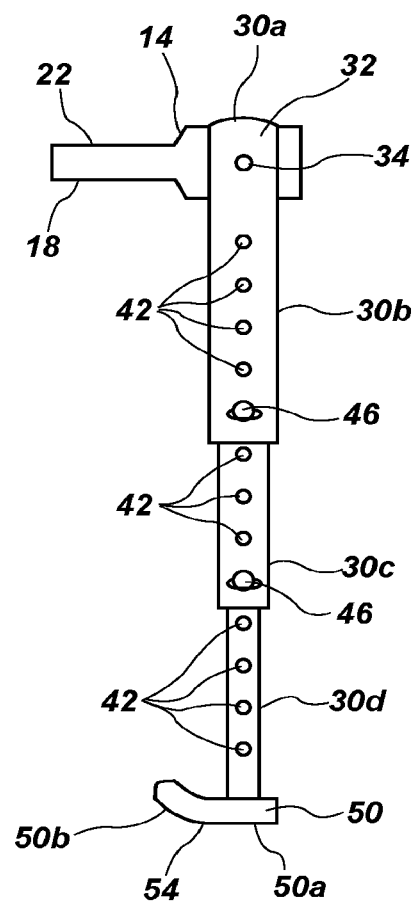
FIG. 2 shows a side view of the ATV jack of FIG. 1.

FIG. 2 shows a side view of the ATV jack of FIG. 1. The structures have been provided with like numbering. The view in FIG. 2 obscures the engagement surface 38 and makes visible the flange 32 at the top of the leg 30 which receives the pin 34 to provide the pivotable engagement between the leg and the engagement member 14. It will be appreciated that other means known to one of skill in the art of pivotably attaching the leg 30 to the engagement member 14 may be used, such as a ball and socket joint and the like.

Figure 3:
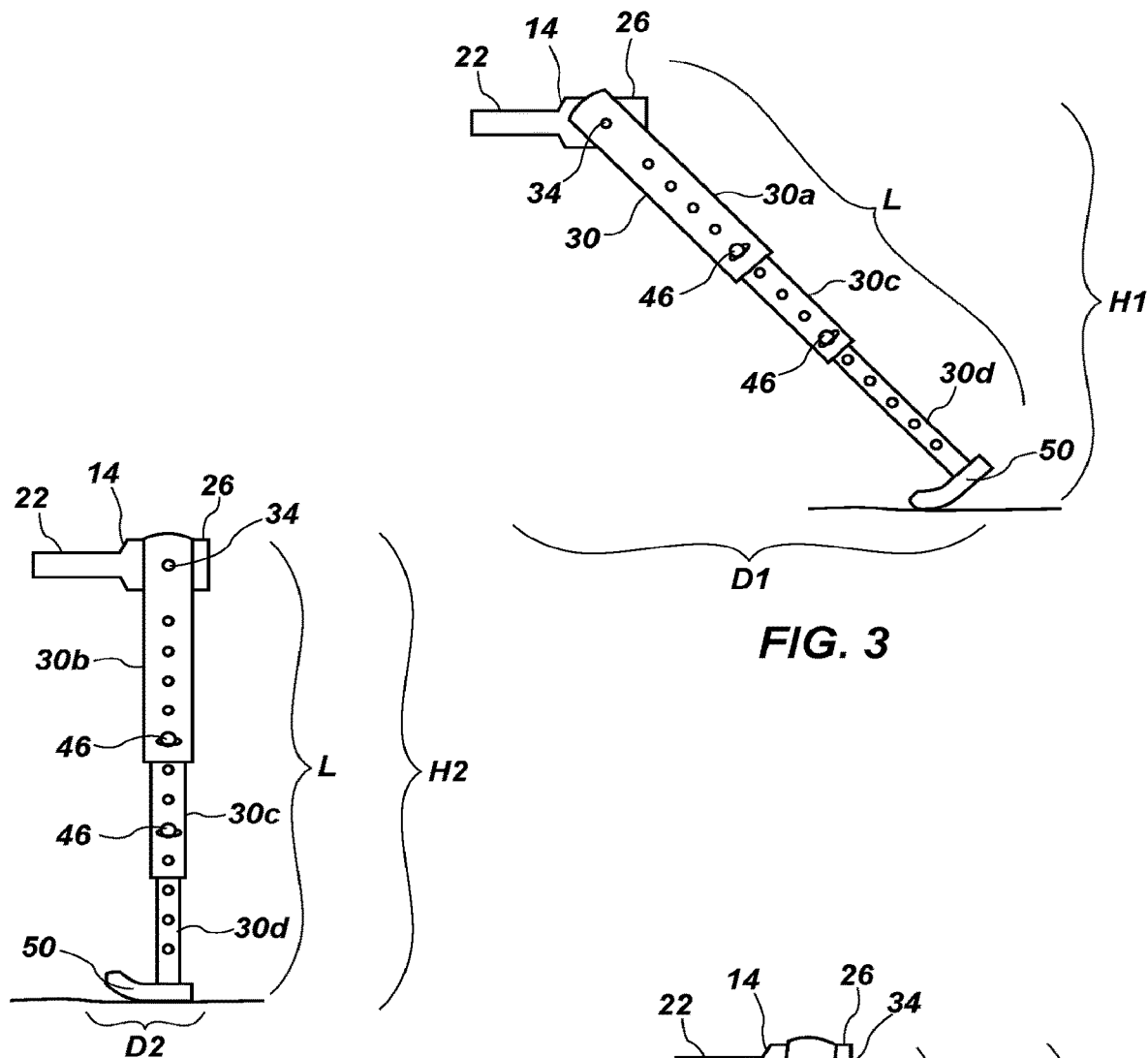
FIG. 3 shows a side view of the ATV jack of FIG. 1, in a first, initial position wherein the insert is at a height H1 above a surface.
Figure 4:
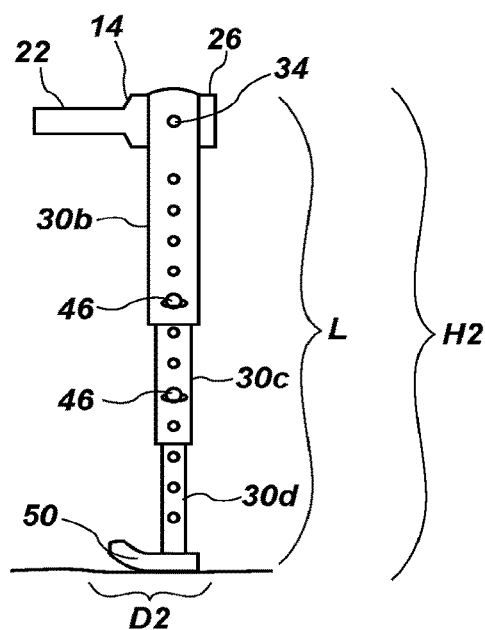
FIG. 4 shows a side view of the ATV jack of FIG. 1, in a second, peak position wherein the insert is at a height H2 above the surface.
Figure 5:
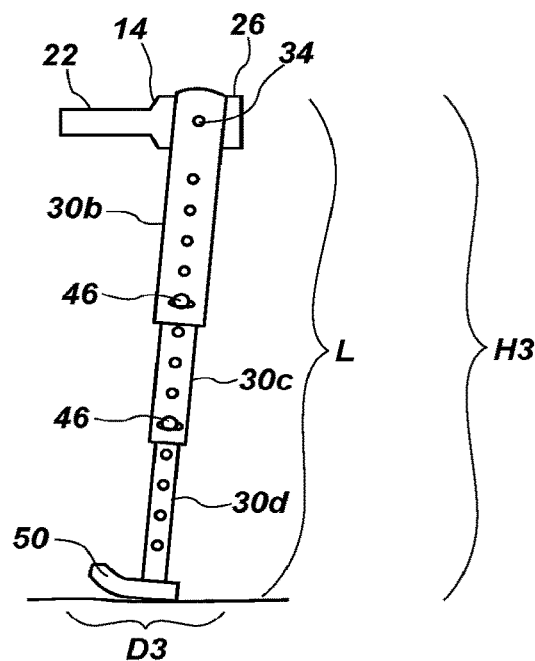
FIG. 5 shows a side view of the ATV jack of FIG. 1 has a third, lift position wherein the insert is at a height H3 above the surface.

Turning now to FIGS. 3-5, there are shown side views of the ATV jack 10 which demonstrate how the jack works. Specifically, the jack 10 is positioned so that the projection 22 of the engagement member 14 is inserted into a hole on the suspension system of the ATV. The angle at which the leg 30 extends from the engagement member 14 will depend on the height of the hole above the surface 60 below the tire. For example, as shown in FIG. 3, the hole has a height (H1) 18 inches above the surface 60. The leg 30 has a length (L) of 32 inches. This provides an extension distance (D1) of approximately 26 inches. In use on a rear tire, the base plate 50 is approximately 26 inches behind the pivot point.

The ATV is then driven toward the jack 10. The base plate 50 engages the surface 60 and maintains its position. This causes the leg 10 to pivot upwardly. As shown in FIG. 4, the top of the leg has been moved rearwardly 26 inches so that the leg is vertical and the distance (D2) goes to zero. This results in the hole in the ATV being lifted to (H2) above the surface 60 to have the minimal height required to lift the tire above the ground, which also provides maximum safety by lifting the vehicle no higher than necessary to lift the wheel off the ground. By going about a few inches (DH3) beyond the point at which the leg 10 is vertical, as shown in FIG. 5, the height (H3) drops slightly lower. The ATV is then put in park and the emergency brake is applied. The distance (D3) the top of the leg 10 can go beyond vertical is controlled by the position of the engagement surface 38 on the leg which limits the amount the engagement member 14 can pivot forwardly. Because the leg 30 is positioned more than vertical, the weight of the ATV prevents the leg from moving back to the original position. To move the leg back into vertical positioning, the ATV must be lifted slightly or the leg will not pivot back into the position shown in FIG. 4.

With the jack 10 in the position shown in FIG. 5, the wheel of the ATV can be repaired or replaced. Once finished, the user merely needs to drive the ATV away from the jack sufficiently for the leg 30 to pivot to vertical as shown in FIG. 4 and then the ATV will naturally move forward so that the leg goes back to the position shown in FIG. 3. Unlike a screw jack which can take several minutes to deploy and which requires a large jack to provide a lift height of, for example, 81.28 centimeters or 32 inches, the present jack and be deployed in under a minute and a relatively compact jack can be used to provide lift over a broad range of heights.

Figure 6:
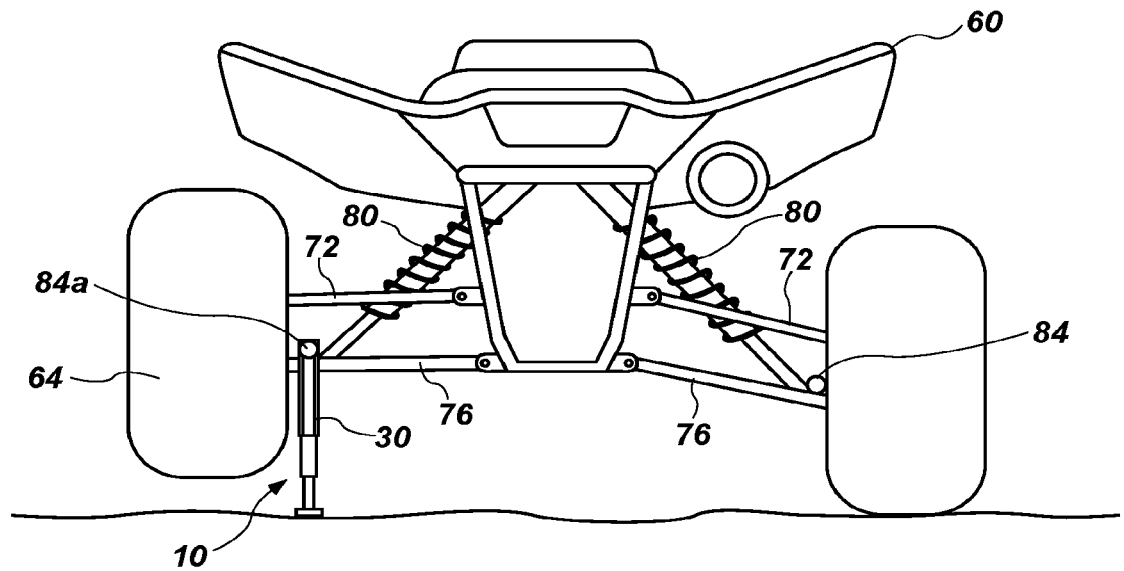
FIG. 6 shows a rear view of an ATV having its left rear tire lifted for removal or repair.

Turning now to FIG. 6, there is shown a rear view of an ATV 60 having its left rear tire 64 lifted for removal or repair. Those familiar with ATVs will appreciate that the suspension system 68 typically includes a plurality of suspension arms 72, 76, and shock absorbers 80. On some models, there is a hollow tube 84 adjacent where the shock absorbers attach to the suspension arms 76. On such models, the projection 22 (FIG. 1) of the engagement member 14 (FIG. 1) of the jack 10 can be inserted into the tube 84 so that the jack can be used to lift the adjacent tire in the manner discussed with respect to FIGS. 3-5. Thus, the ATV 60 shown in FIG. 6 has had the projection 22 of the jack 10 inserted into tube 84a and the ATV driven rearwardly to engage the jack and lift the left rear tire 64 as shown. Once the tire 64 is repaired or replaced, the ATV 60 is simply driven forward. The projection 22 of the engagement member 14 is removed from the tube, and the pins (not shown) are removed to allow the jack 10 to collapse down to a compact size so that it may be stored in a glovebox or some other holder on the ATV 60.

One significant advantage of the present invention is that it loads the suspension (i.e. puts the suspension into a state of compression), when the jack 10 is lifting the wheel 64 above ground. In a typical jack arrangement, the jack engages the frame of the vehicle and the frame is lifted until the desired wheel is off the ground. Because the suspension is unloaded, the weight of the wheel pulls the suspension down. This is why, for example, the frame of a car must be lifted several inches before the tire even lifts off the ground. In an ATV, the suspension is designed to provide much more play or extension than in a conventional car. Thus, to lift the wheel off the ground by simply engaging the frame of the ATV can require the ATV to be lifted a substantial distance, potentially leaving it unstable.

Accordingly, the various embodiments of the present invention have the added advantage that the jack can be positioned on a bracket that is mounted to the suspension system of the ATV, which enables the jack to preload the ATV suspension when the vehicle is lifted up by the jack. By preloading the suspension, the ATV can be lifted minimally off the ground so as to maintain the lowest possible distance from the ground, while still allowing enough lift to accomplish the necessary repairs to a tire. With this approach, if a vehicle were to fall from the lifted position, it would only fall a few inches. This makes the jack of the present invention significantly safer than conventional jacks.

In contrast, as shown in FIG. 6, the ATV has been advanced toward the jack to cause the jack to engage and lift part of the weight of the ATV, resulting in the tire 64 being lifted, while the frame of the ATV has been rotated only a modest amount to the right. This results in a more stable position for the ATV and reduces the risk that it may roll over in steep terrain.

Figure 7:
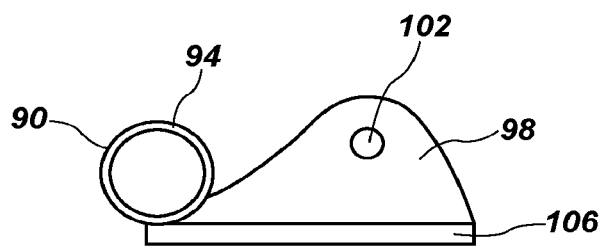
FIG. 7 shows an end view of a bracket which may be used on an ATV to facilitate the use of the ATV jack.

While some ATVs have tubes such as those shown in FIG. 6 adjacent some tires, most ATVs do not have such tubes adjacent all tires. Thus, FIG. 7 shows an end view of a mounting bracket 90 which may be used on an ATV to facilitate the use of the ATV jack (FIGS. 1-6). The mounting bracket 90 may include a tube 94 configured to receive the engagement member (FIGS. 1-5), and a one or more arms 98 extending from the tubes. The arms 98 may have a hole 102 which is sized to receive a bolt, such as the bolt which connects the shock absorber 80 (FIG. 6) to the suspension arm 76 (FIG. 6). The arms 98 may also include a flange 106 to provide additional structural support to the arms.

Figure 8:
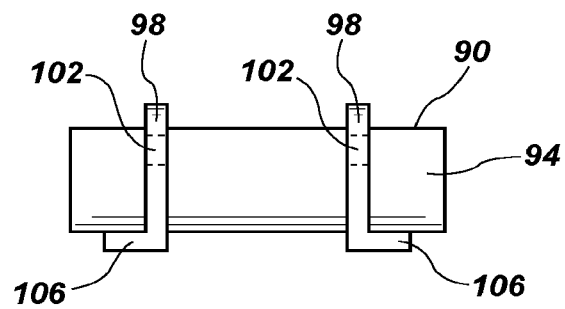
FIG. 8 shows a side view the bracket of FIG. 7.
Figure 9:
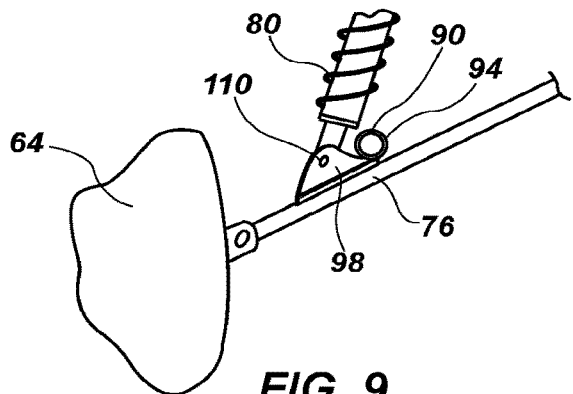
FIG. 9 shows the bracket of FIGS. 7 and 8 mounted on the engagement of a suspension arm and a shock absorber of an ATV.

FIG. 8 shows a side view of the mounting bracket 90 of FIG. 7. As shown, two arms 98 are used so that the mounting bracket 90 may be attached on both sides of the suspension arm 76 (FIG. 6) at the juncture with the shock absorber 80 (FIG. 6). Attaching the mounting bracket 90 to the suspension system of the ATV is relatively easy, as shown in FIG. 9. The bolt holding the bottom of the shock absorber 80 to the suspension arm 76 is removed. The holes 102 (FIG. 7) in the arms 98 of the mounting bracket are placed in alignment with the holes through which the bolt previously passed. A new bolt 110 which is sized to accommodate the additional thickness added by the arms (or the original bolt if it is long enough) is then slid through the hole of one arm, through the hole in the suspension arm 76, through the base of the shock absorber 80, through the other hole in the suspension arm 76 and through the hole in the second arm of the mounting bracket 90. In a matter of a few minutes, mounting brackets 90 can be added adjacent each wheel of the ATV, thereby positioning the tube 94 to allow the jack 10 to be used on any wheel as shown in FIG. 9.

Figure 10:
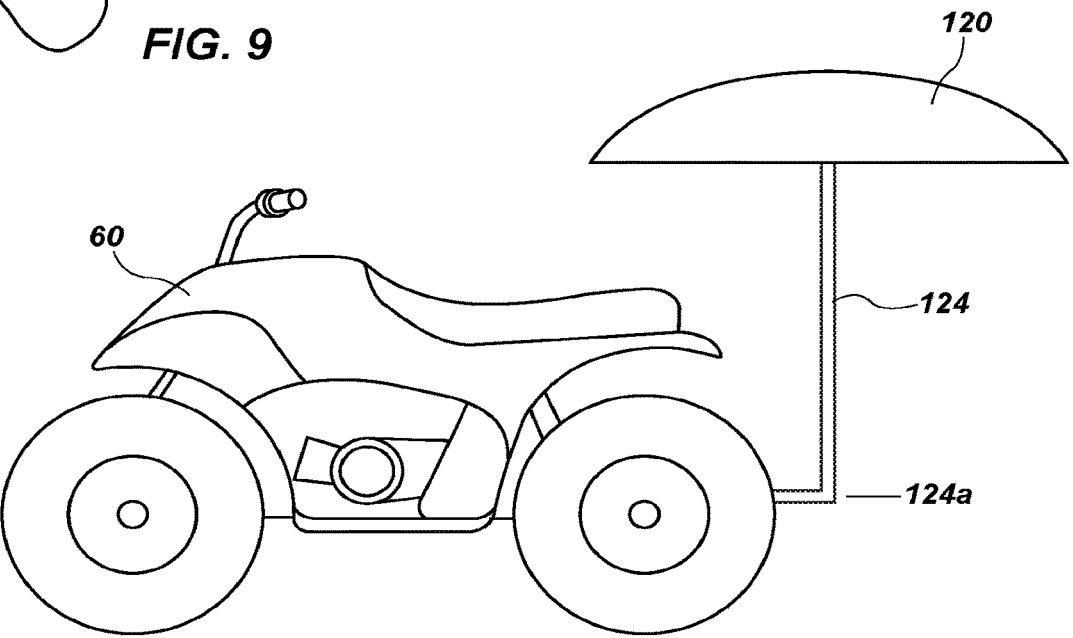
FIG. 10 shows a side view of an ATV which is using the bracket of FIG. 8 to hold an umbrella.

While providing a convenient attachment point for the jack 10 (FIGS. 1-6), the mounting bracket 90 can be used for a number of other purposes. For example, FIG. 10 shows a side view of an ATV 60 which is using the mounting bracket of FIG. 8 to hold an umbrella 120. The umbrella includes a stand 124 which includes a lower portion 124a which is insertable into the mounting bracket (not shown) to hold the stand upright and hold the umbrella 120 above all or part of the ATV. It will be appreciated that the lower portion 124a could include projections which engage the suspension arms, etc., to provide lateral stability. Additionally, the tube 94 (FIG. 9) can be shaped to provide for lateral stability while still allowing for use of the jack 10 (FIG. 1)—for example, the tube 94 may be triangular or square in cross section. The projection 22 (FIGS. 1-6) of the engagement member 14 (FIGS. 1-6) may be shaped to match the shape of the tube 94 (FIG. 9).

Figure 11:
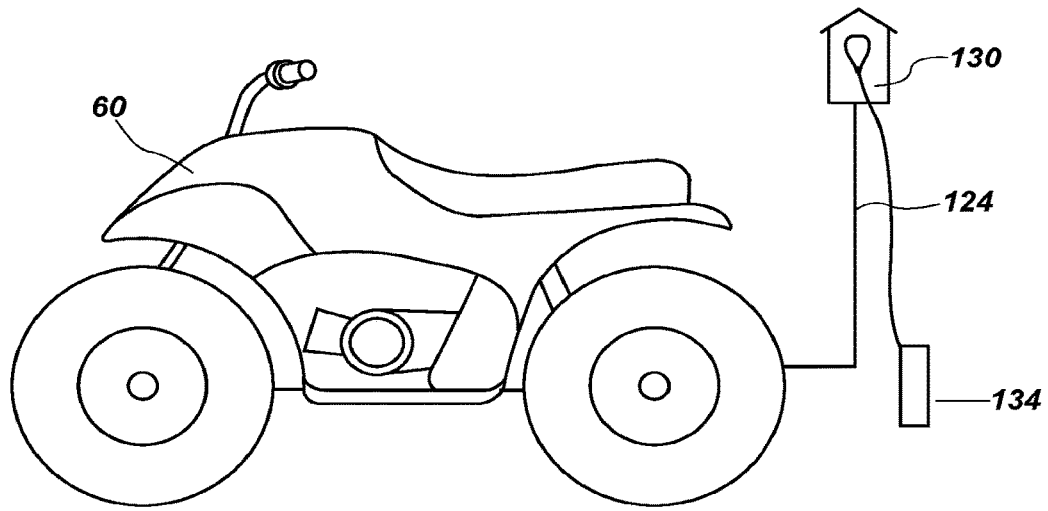
FIG. 11 shows a side view of an ATV which is using the bracket to hold a light powered by a propane cylinder.

FIG. 11 shows an ATV 60 having a stand 124 which is being used to hold up a propane powered lantern 130. The lantern 130 may be connected by a tube to a propane tank 134. The stand 124 allows the light to be held up and provide light to an area, such as where people are going camping on their ATVs in areas which lack a table or other structure to hold the lantern 130. Keeping the lantern 130 well above the grass also reduces the risk of accidentally starting a fire by the lantern being knocked over.

It will be appreciated that one or more of the mounting brackets could be used at the same time, such as to support a cover frame over which a cover or rain shield for the ATV is mounted. Likewise a small work table or cookstove could be held using the mounting brackets.

Figure 12:
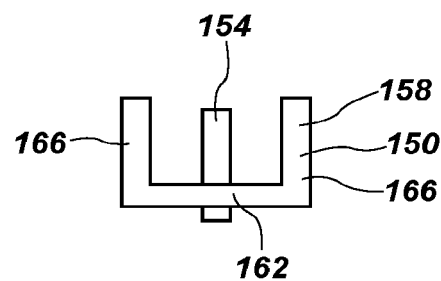
FIG. 12 shows a top view of an adapter which may be used to engage a suspension arm of an ATV for use with the ATV jack.
Figure 13:
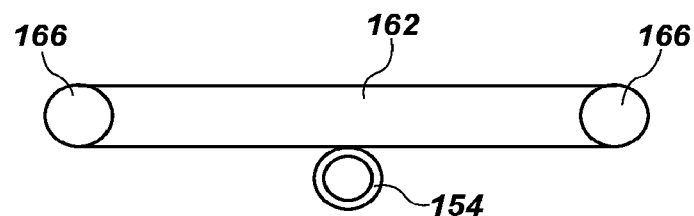
FIG. 13 shows an end view of the adapter of FIG. 12.

While the mounting brackets discussed above are a presently preferred embodiment, the jack 10 (FIGS. 1-6) could include an adaptor to allow use on ATVs lacking the mounting brackets or a comparable tube. Thus, FIG. 12 shows a top view of an adapter 150 which may be used to engage a suspension arm of an ATV for use with the ATV jack. The adapter 150 includes a tube 154 configured to receive the projection 22 (FIGS. 1-5) of the engagement member 14 (FIGS. 1-6). The adapter may also include a U-shaped collar 158 having a base 162 and a pair of adapter arms or prongs 166. The tube 154 is attached to the U-shaped collar as shown in FIG. 13. The U-shaped collar may be formed from tube steel or other material of sufficient strength to engage and hold the suspension arm.

In FIG. 13, there is shown a front view of the adapter of FIG. 12, including the tube 154 configured to receive the projection 22 (FIGS. 1-5) of the engagement member 14 (FIGS. 1-6). The tube 154 may be, for example, circular, or may be triangular, square, grooved, or otherwise irregularly shaped in cross-section to match the shape of the projection 22 (FIGS. 1-5) of the engagement member 14 (FIGS. 1-6). In some embodiments, the tube 154 may be adapted to receive the projection 22 (FIGS. 1-5) so that when the projection 22 is inserted, the arms or prongs 166 are held at an offset angle.

Figure 18:
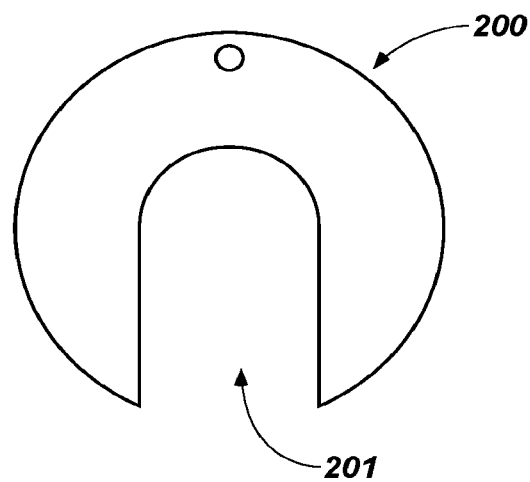
FIG. 18 shows a front view of a safety collar.
Figure 19:
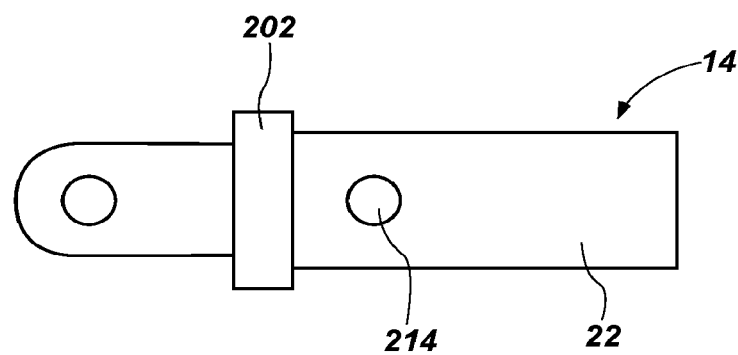
FIG. 19 shows an engagement member and projection that make up a frame pin.
Figure 34:
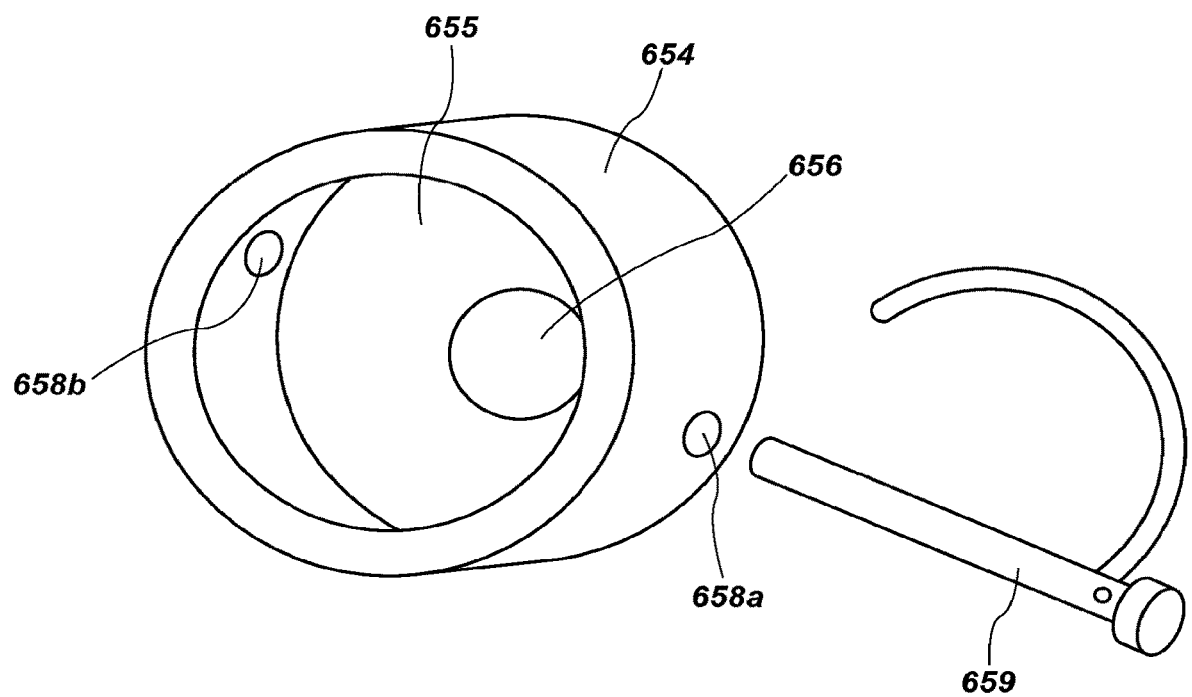
FIG. 34 shows a perspective view of a vehicle mounting bracket.
Figure 35:
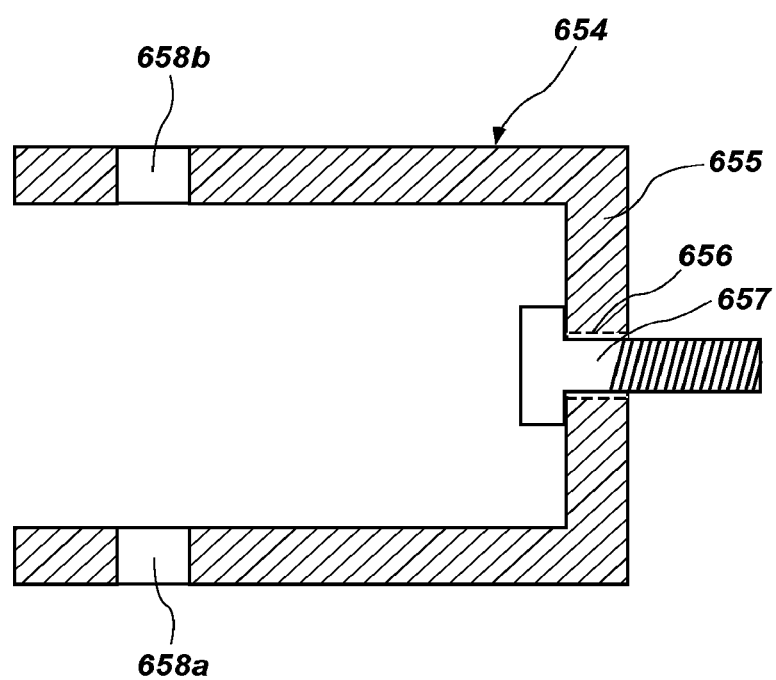
FIG. 35 shows a sectional view of a vehicle mounting bracket.

FIGS. 34 and 35 show another embodiment of a vehicle mounting bracket, which comprises a tube 654 having an open end configured to receive the projection 22 (FIGS. 1-5) of the engagement member 14 (FIGS. 1-6). The tube 654 further comprises a closed end 655 with a hole 656 configured to receive a bolt for attaching the bracket to a vehicle by means of a vehicle bolt. The sides of tube 654 also have holes 658a and 658b for receiving a retaining pin 659 that extends through the holes 658a and 658b, as well as hole 214 that extends through the side of the projection 22 (shown in FIGS. 18, 19). Some ATVs have a suspension system that includes a shock that is connected to the vehicle with a shock bolt 657. The mounting bracket shown in FIG. 34 is designed to be attached to the vehicle with the shock bolt by inserting the shock bolt through the inside of the tube 654 and through hole 656, and then through the shock, where it is secured with a shock bolt nut. When secured, tube 654 extends outwardly so that the projection of the engagement member can be inserted into the tube and the jack can then lift the vehicle above the ground for repair or maintenance.

Figure 14:
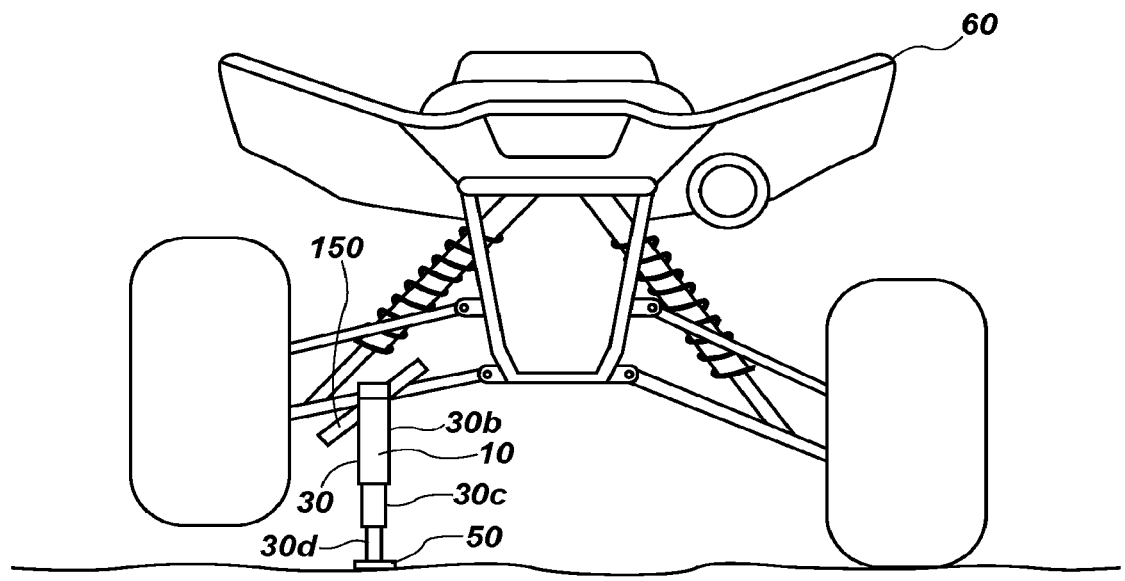
FIG. 14 shows a rear view of an ATV having one wheel jacked up using a jack and the adapter.

Turning to FIG. 14, there is shown a rear view of an ATV having one wheel jacked up using a jack 10 and the adapter 150. The projection of the engagement member (not shown) is inserted into the tube (not shown). The adapter 150 is advanced so that the arms or prongs 166 (FIG. 13) are disposed on opposing sides of the suspension arm 76 and the ATV is then reversed so that the foot 50 engages the surface 60 and the jack 10 lifts the suspension arm 76 (FIG. 6) in the manner discussed above. It will be appreciated that the adapter 150 may be integrally formed with the engagement member 14 (FIGS. 1-6), or may be a separate piece.

Figure 15:
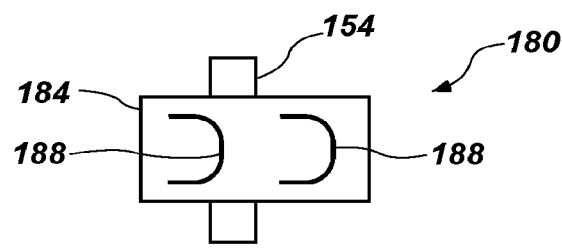
FIG. 15 shows an alternate adapter which may be mounted on a suspension arm for replacing a tire.

FIG. 15 shows an alternate mounting bracket/adapter which may be mounted on a suspension arm 76 (FIG. 6) for replacing a tire. The adaptor indicated generally at 180 may include a tube 154 and a base plate 184. A pair of U-bolts 188 engage the plate and extend generally parallel to the tube 154. The U-bolts are held in place by nuts (not shown). In use, the U-bolts 188 are placed around one of the suspension arms of the ATV and secured in place. The engagement member from the jack is then inserted into the tube and used to lift that suspension arm in a manner discussed above.

Figure 16:
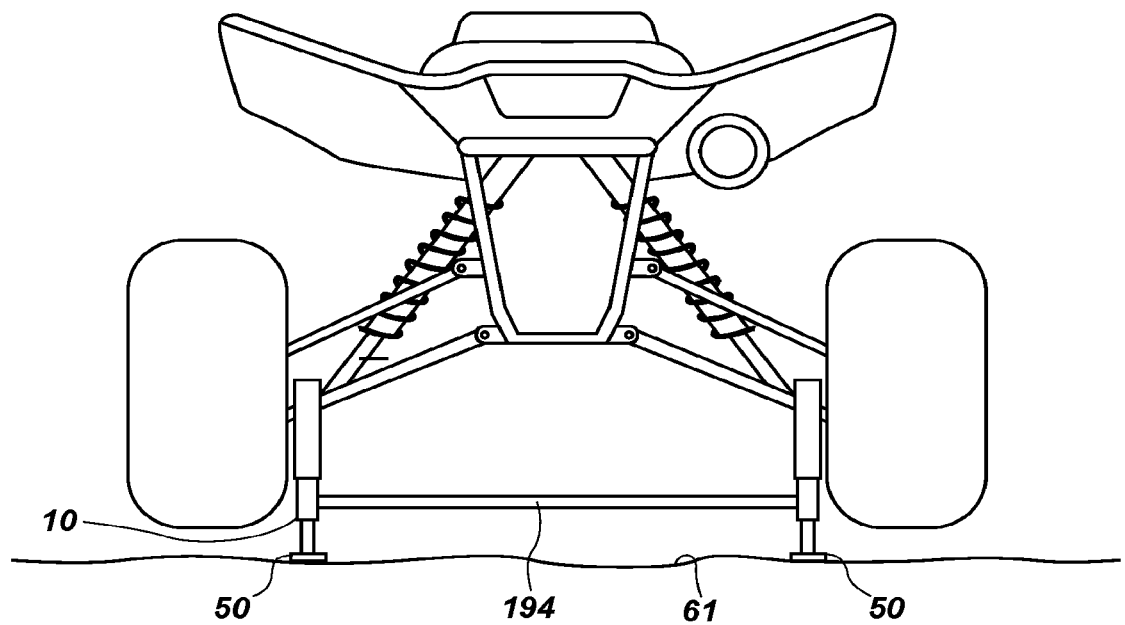
FIG. 16 shows the use of a pair of jacks to lift an entire end of an ATV.

FIG. 16 shows the use of a pair of jacks to lift an entire end of an ATV. Each jack 10 is attached to one of the holes (either part of the suspension system or an adapter/mounting bracket) as discussed above. The ATV is then driven backwards so that the base plates 50 engage the surface 60 and lift both sides of the ATV. A brace 194 can be used to provide extra support to the jacks 10 and provide additional lateral stability. The brace 194 may, for example, engage the holes in the jacks by bolts, pins or the like.

Figure 17:
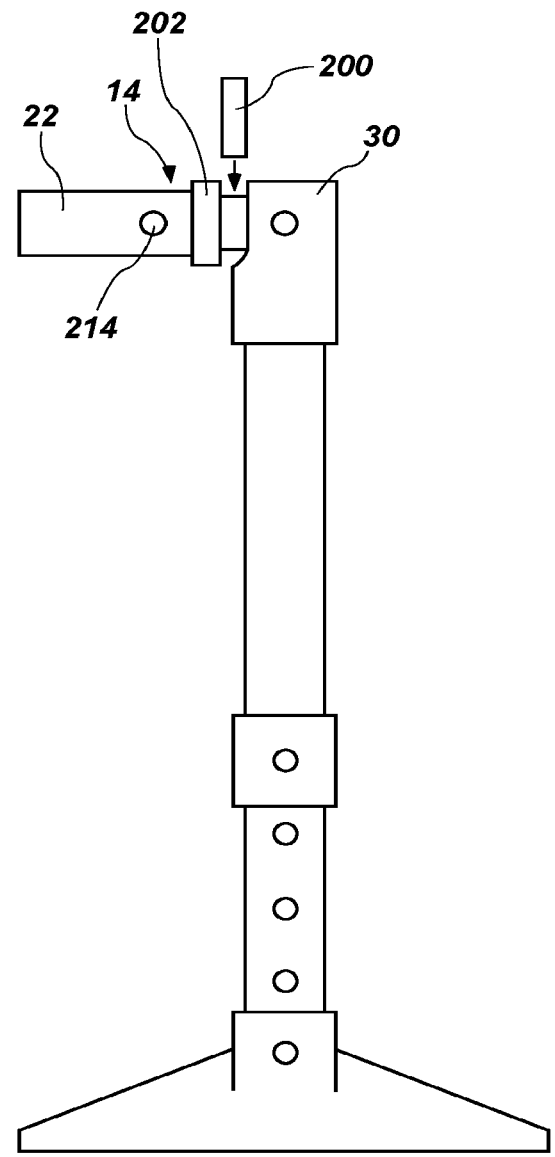
FIG. 17 shows a side view of a jack made in accordance with the present disclosure.

The safety lock system shown in FIG. 17 comprises a radial flange disposed around and near a proximal end of the engagement member and a safety collar having an opening configured to fit over the engagement member between the radial flange and the leg, thereby locking the engagement member in place and preventing the engagement member from pivoting and allowing the vehicle to move and potentially fall on an individual who may be underneath the vehicle conducting repairs or maintenance. A top portion of the leg comprises a flange having a single side opening configured to restrict the engagement member from pivoting greater than about 45 degrees. FIG. 17 illustrates one particular embodiment of such safety feature for locking the engagement member 14 and projection 22 in place while in use, thereby preventing the engagement member and projection from pivoting. As shown in FIG. 17, the safety feature of this embodiment comprises a safety collar 200 having an opening 201 that is placed over the projection 22 to lock the engagement member 14 and projection 22 in place. As shown in FIG. 17, the engagement member 14 is comprised of projection 22 and a flange 202 positioned near the proximal end of the projection attached to leg 30. Flange 202 is positioned sufficiently close to leg 30 that when the safety collar 200 is positioned on the projection 22 of the engagement member 14 between the flange 202 and leg 30, the engagement member 14 and projection 22 are locked in place and prevented from pivoting.

In yet another embodiment, FIG. 17 shows an additional safety feature for locking the projection 22 together with the tube 94 of mounting bracket 20 to prevent release of the projection from the tube when the jack is in use to support a vehicle above the ground for repair or maintenance. As shown in FIG. 17, projection 22 is locked to tube 94 by inserting pin 210 through holes 212a and 212b of tube 94 of mounting bracket 20 and hole 214 of projection 22 when the projection is inserted into the tube and the holes are aligned.

Figure 20:
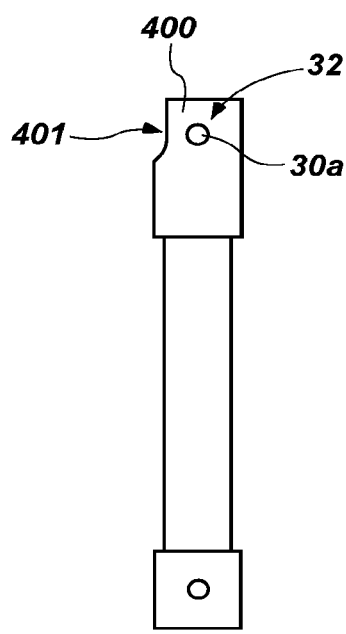
FIG. 20 shows a side view of a jack body.
Figure 21:
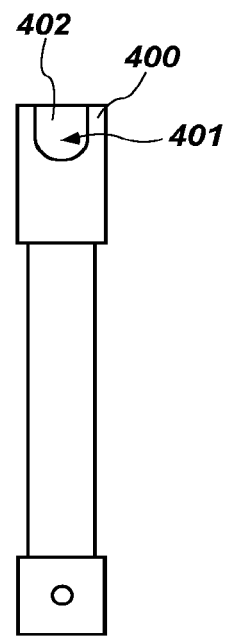
FIG. 21 shows a front view of a jack body.

FIGS. 20 and 21 further show the top portion of the leg 30, which comprises a cylindrical tube forming at a top end flange 400 to which the engagement member 14 is pivotally attached. As shown in FIG. 17, the flange extends from the end of the tubular leg 30 and has a single side opening 401 configured to allow the engagement member to pivot from a position parallel to the axis of the tubular leg 30 to a sideways position at an angle of about 45 degrees from the axis of the tubular leg 30. Because there is only a single opening in the flange, the side of the flange opposite the opening restricts the engagement member from pivoting to the opposite side 402 of the leg. This feature significantly improves the strength and structural integrity of the flange and its ability to support the weight of an ATV when the jack is in use.

Figure 22:
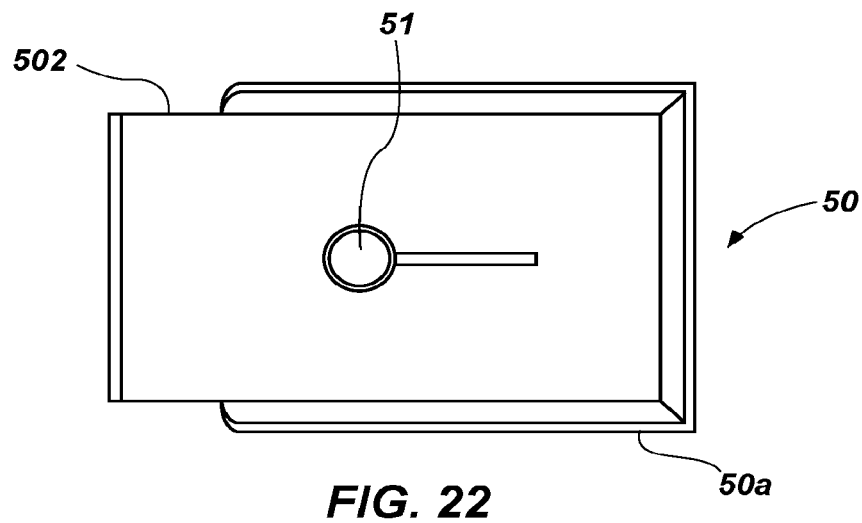
FIG. 22 shows a top view of a sand foot plate.
Figure 23:
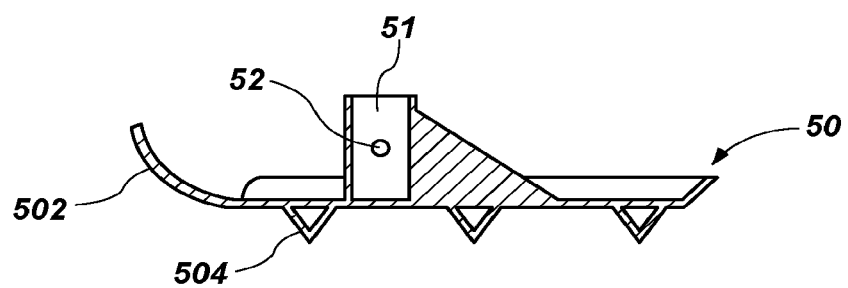
FIG. 23 shows a side view of a sand foot plate.
Figure 24:
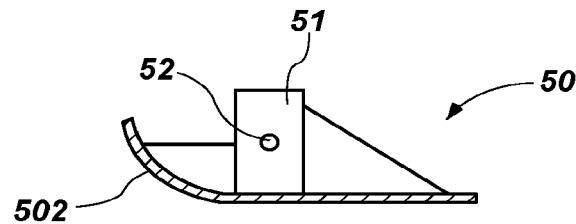
FIG. 24 shows a side view of a foot plate with a rounded edge.
Figure 25:
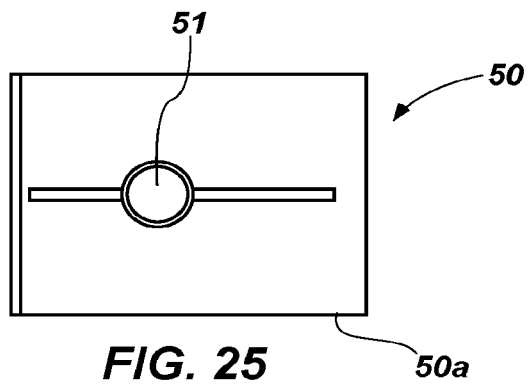
FIG. 25 shows a top view of a foot plate with a rounded edge.
Figure 26:
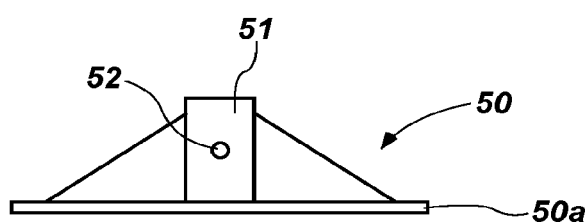
FIG. 26 shows a side view of a standard rectangular foot plate.
Figure 27:
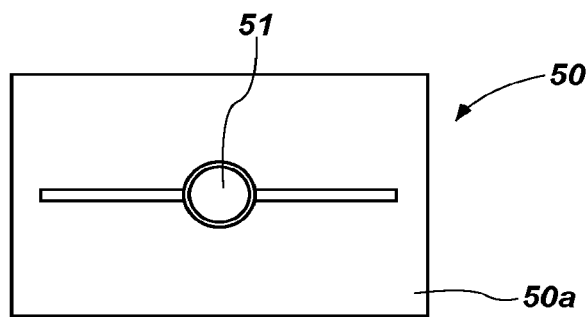
FIG. 27 shows a top view of a standard rectangular foot plate.
Figure 28:
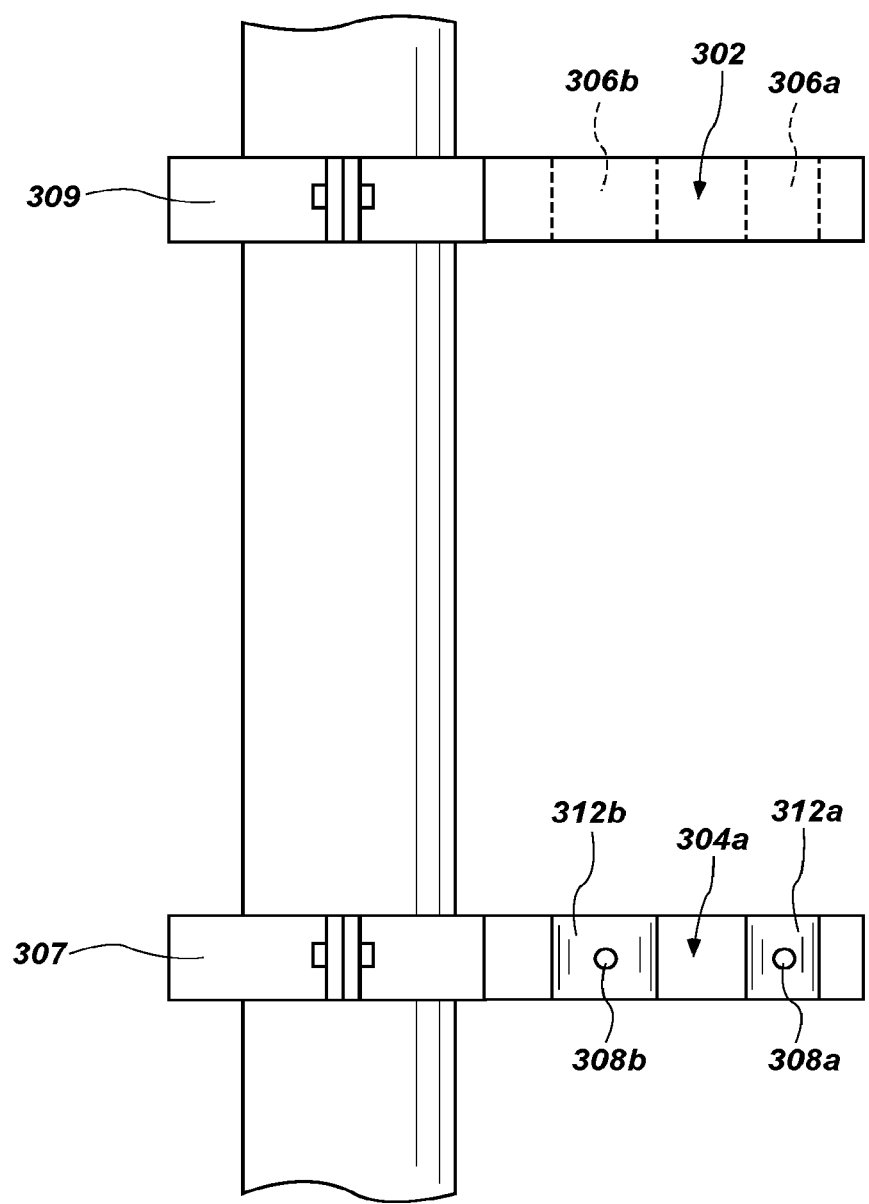
FIG. 28 shows a vehicle mounting system.

FIGS. 22-27 show various possible base configurations that can be attached to the bottom of tubular leg 30 or a telescoping extension, respectively suitable for different ground terrain on which the ATV may be located. For example, FIGS. 22 and 23 show a base plate 50 suitable for use in sand, having a curved edge 502 and lugs 504 for gripping the sand. FIGS. 24 and 25 show another possible base plate 50 configuration with a curved edge 502, but without lugs. FIGS. 26 and 27 show a standard base plate 50 having a flat rectangular shape. The base of the jack may also comprise only a leg segment with a pointed end or a rubber foot, such that the leg segment functions as both a leg segment and a base support.

In another aspect, the present invention further includes a storage bracket comprising a first mounting bracket and a second mounting bracket configured to mount to an ATV, wherein the first mounting bracket comprises one or more holes to receive a projection of a jack component and the second mounting bracket comprises one or more clamps configured to clamp the bottom of the jack component to the second mounting bracket. One particular embodiment of this aspect is shown in FIGS. 28-33, which show a vehicle mounting bracket 300 for storage and transport the ATV jack on a vehicle. The storage bracket comprises a first bracket 302 and a second bracket 304. The first bracket 302 has one or more holes configured to receive a projection of a jack component (i.e., the projection 22, or the end of a leg segment), while the second bracket 304 comprises a clamp configured to clamp the other end of the jack component firmly in place. It is understood that the vehicle mounting bracket may be mounted horizontally or upside down, such that the "top bracket" and the "bottom bracket" referred to above are positioned side-to-side or in reverse orientation (i.e., bottom bracket is on top and top bracket is on the bottom).

Figure 29:
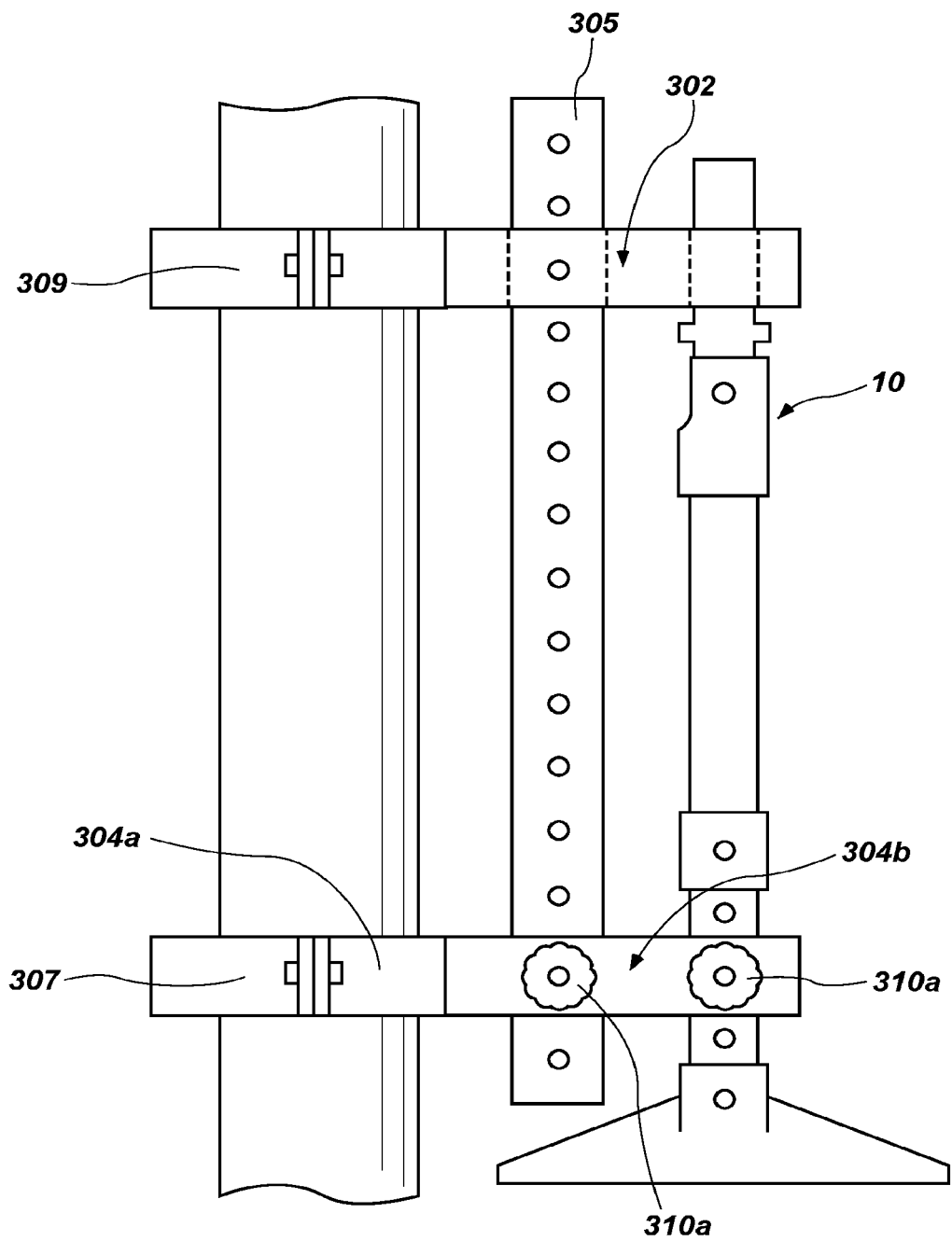
FIG. 29 shows a vehicle mounting system with a jack mounted thereon.
Figure 30:
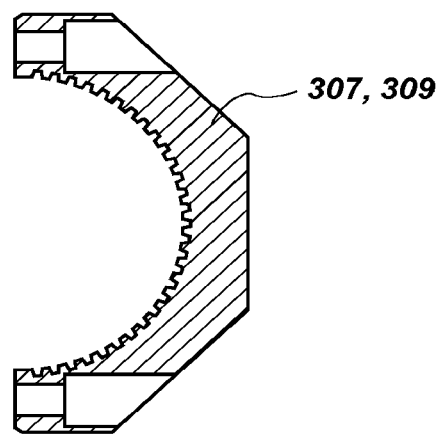
FIG. 30 shows a top view of a clamp.
Figure 31:
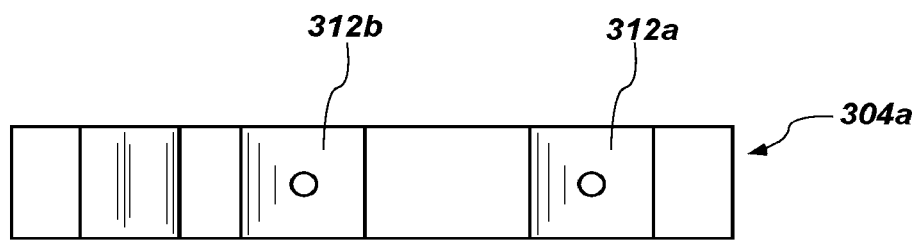
FIG. 31 shows a top view of a clamp base.
Figure 32:
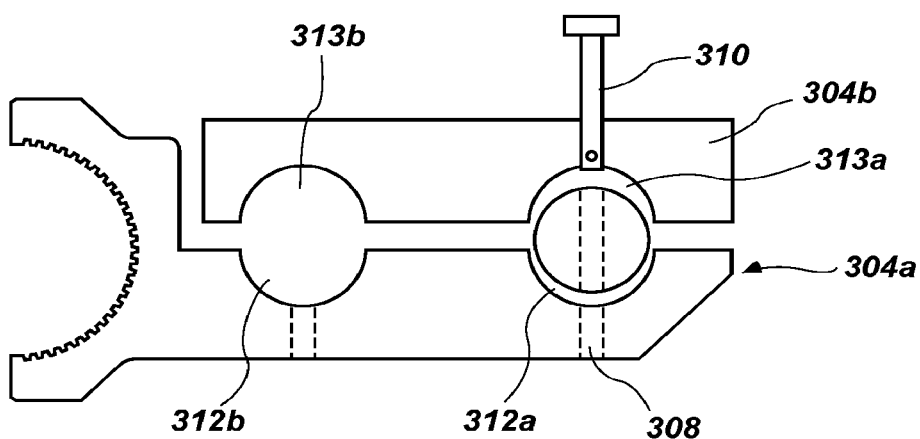
FIG. 32 shows a side view of a clamp base.
Figure 33:
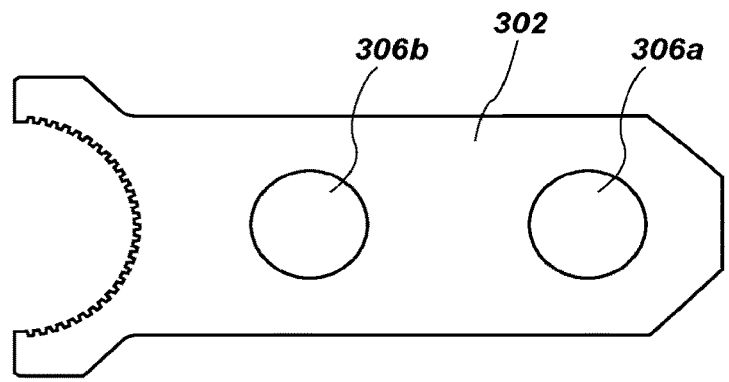
FIG. 33 shows a top view of a clamp base.

The top bracket 302 and bottom bracket 304 are attached to an ATV, such as to a roll bar, by means of clamp ends 307 and 309. Top bracket 302 comprises one or more vertical holes, such as vertical hole 306a and 306b, that are configured to receive the projection 22 and/or an additional or alternative segment of the leg 30. The bottom bracket 304 is shown with recesses 312a and 312b configured to receive the leg segments and horizontal holes 308a and 308b within the recesses that are configured to receive either pin 310 that extends through hole 308 and through one of holes 42 of the leg 30 (as shown in FIG. 32), or alternatively a threaded bolt with a handle, such as 310a and 310b (as shown in FIG. 29). Jack 10 is secured to the vehicle mounting bracket 300 by first inserting the projection 22 of jack 10 (or one end of leg segment 305) into hole 306a and/or 306b and then aligning one of holes 42 of the bottom of jack 10 (or other end of leg segment 305) with holes 308a and/or 308b of the vehicle mounting bracket and inserting a pin 310 (or threaded screw) through the holes 42 and 308a or 308b to fix the bottom portion of the jack 10 or leg segment in place on the ATV mounting system. Although it is possible to pin or bolt the jack and its accessories directly to the mounting bracket 304a, it is also contemplated that the bottom bracket 304 may further include a clamp 304b with recesses 313a and 313b that are configured to be placed over the end of the leg segment and jack to clamp them more securely in place, as shown in FIG. 32.

In another aspect, the removable engagement member may comprise a clamping mechanism to secure the ATV jack of the present invention to the ATV. The clamping mechanism, like the removable engagement member described above, is pivotally attached to the leg. Use of a clamping mechanism has the advantage of avoiding the necessity of installing a separate mating engagement member to the suspension system of the ATV, which requires that a mating engagement member be installed on an axle assembly of the suspension system of each wheel. Thus, the clamping mechanism may simplify use of the ATV jack of the present invention by allowing the jack to simply be clamped to the top portion of the ATV jack directly to the suspension system (such as an axle, strut, suspension leg or other available structure) of the ATV.

Specific embodiments of suitable clamping mechanisms are shown in FIGS. 36-39. For example, FIG. 36 illustrates one specific embodiment of a clamping mechanism, which is a clamp that is clamped shut from the outer lips 701b and 702b of the clamp jaws 701 and 702. Clamp jaws 701 and 702 further include teeth 701a and 702a which may help the clamp jaws securely engage with a support structure on the ATV suspension system. In this embodiment, the clamp is pivotally attached to the top of leg 30. The entire clamp assembly can pivot about pivot pin 34. In addition, clamp jaws 701 and 702 can expand and clamp by pivoting about pins 703 and 704, which allows the clamp jaws 701 and 702 to expand sufficiently to be placed around and secured to any available structure on the suspension system capable of bearing the weight of the vehicle. As shown in FIG. 36, the clamping mechanism includes a bolt 710 that is pivotally secured to the lower clamp jaw 702 by being screwed through a stationary or pivoting nut 715 that is secured to the lower jaw 702. The bolt 710 is releasably engageable with the top clamp jaw 701 by sliding through a slot 705 in the front of clamp jaw 701, which has a depression formed by flange 713 to keep the bolt 710 secured to the upper clamp jaw 701. The bolt 710 may further include an annular flange 714 at a top portion of the bolt to engage with the depression formed by flange 713 and force the clamp jaws closed.

In order to secure the clamping mechanism to a support structure on the suspension system, the bolt 710 is released from the clamping position in the depression formed by flange 713 and pivoted forwardly out of the way to allow jaws to surround a support structure on the suspension system. With the clamp jaws 701 and 702 in position around a support structure, the clamp jaws are closed and the bolt 710 can then be repositioned in the slot 705 of the upper clamp jaw 701. By hand turning the butterfly bolt head 712, the annular flange 714 at the top of the bolt 710 is secured within the depression formed by flange 713 and the clamp jaws are forced shut. The bolt 710, because it is used to clamp the clamp jaws 701 and 702 shut from the front (where the support structure of the ATV suspension system must enter and exit from between the clamp jaws, also serves as a safety mechanism by locking the support structure of the ATV suspension system inside the clamp jaws 701 and 702 and prevents the support structure from coming out from between the jaws.

An alternative clamping mechanism is shown in FIGS. 38 and 39. In this embodiment, the bolt also functions to open and close the clamp jaws, but is positioned at the rear of the clamp jaws 701 and 702 to open and close the jaws of the clamp from the rear. In FIGS. 38 and 39, the bolt 710 has similar structures as the embodiment in FIGS. 36 and 37 to clamp the clamp jaws 701 and 702 shut.

Figure 42:
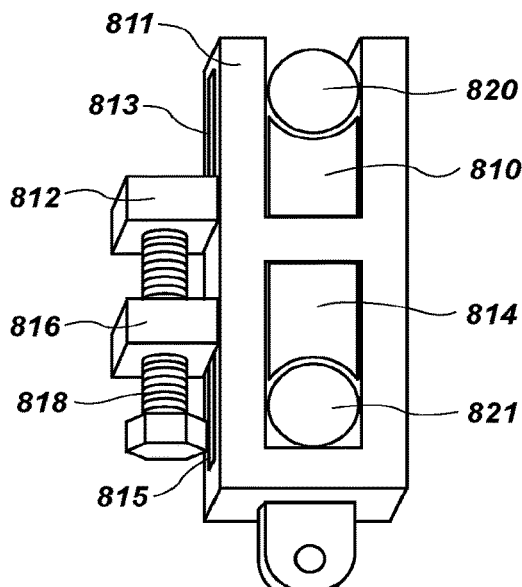
FIG. 42 shows another embodiment of a clamping bracket used to clamp between two structures.

Other acceptable clamping mechanisms are shown in FIGS. 40-46. For example FIGS. 40-42 show different variations of a simple screw type clamp mechanism. FIG. 40 shows a clamp having a first clamp jaw 810 with a flange 812, a second clamp jaw 814 with a flange 816, and a screw 818 disposed between the two flanges to clamp closed or separate the first and second clamp jaws 810 and 814. The first and second clamp jaws 810 and 814 are separated a distance so as to allow them to clamp onto two separate support structures 820 and 821. Suitable support structures may include, for example, two separate control arms of the suspension system. The clamping engagement member may be configured to separate a large distance to accommodate the distance between the control arms.

FIG. 41 shows a clamp having a first clamp jaw 810 with a flange 812, a second clamp jaw 814, with the screw 818 configured to directly impinge on the second clamp jaw 814 and cause it to clamp down on the support structure. The first and second clamp jaws 810 and 814 are separated a distance so as to allow them to clamp onto two separate support structures 820 and 821.

FIG. 42 shows an alternatively clamp embodiment having a first clamp jaw 810 with a flange 812, a second clamp jaw 814 with a flange 816, where the two clamp jaws slide within a housing 811. A screw 818 disposed between the two flanges clamps closed or separates the first and second clamp jaws 810 and 814. In FIG. 42, the clamp jaws separate to engage the two support structures 820 and 821.

Figure 43:
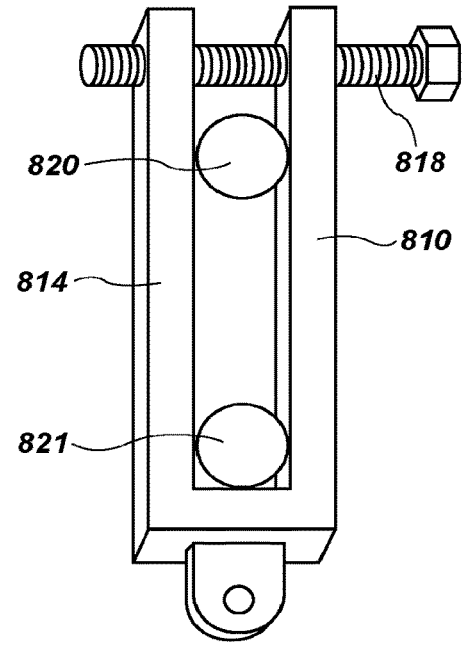
FIG. 43 shows another embodiment of a clamping bracket used to clamp between two structures

FIG. 43 shows a simple clamp embodiment having a first clamp jaw 810 and a second clamp jaw 814 that are part of non-pivoting C-clamp structure. Screw 818 can either prevent release of the clamp from the two support structures 820 and 821, or alternatively the first and second jaws 810 and 814 are made of sufficiently flexible material that the screw causes the first and second clamp jaws to clamp together and actually clamp onto the support structures.

Figure 44:
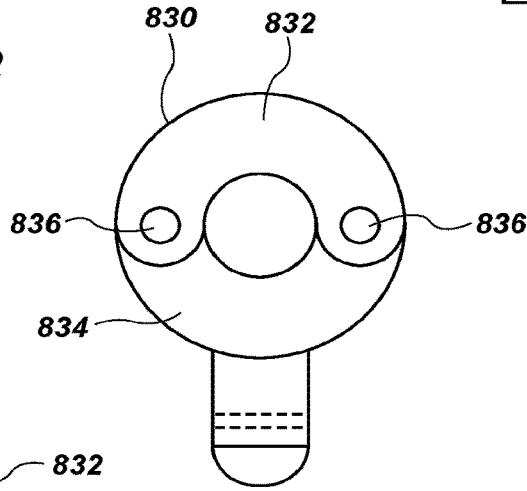
FIG. 44 shows a front view of another embodiment of a clamping bracket used to clamp onto a single structure.
Figure 45:
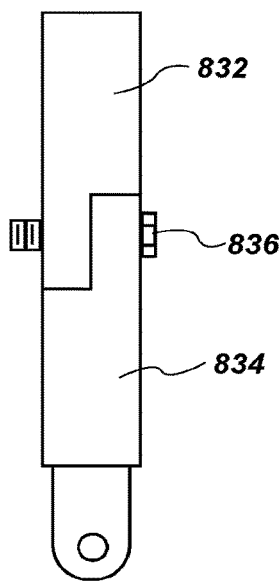
FIG. 45 shows a side view of the clamping bracket of FIG. 44.
Figure 46:
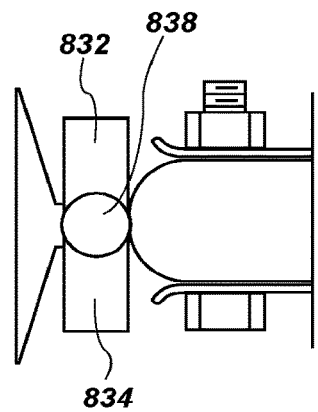
FIG. 46 shows the clamping bracket of FIGS. 44 and 45 clamped onto a vehicle structure.

FIGS. 44-46 show an embodiment in which an annular ring 830, comprised of a first segment 832 and second segment 834 are screwed together with screws 836 to form an annular ring. The annular ring 830 may have the internal portion of the ring 831 shaped to conform to the shape of a support structure on the vehicle, such as a shock base 838.

Other types of clamping mechanisms are also contemplated and can be designed by those skilled in the art.

Thus there is disclosed a new "ATV" jack for use with off road vehicles. As used in the claims, the term ATV should be considered to include UTVs and ROVs as well. Those skilled in the art will appreciate numerous medications which may be made without departing from the scope and spirit of the invention. The appended claims are intended to cover such modifications.

What is claimed is:

1. A non-pneumatic crankless fulcrum ATV jack for removably mounting to an ATV suspension system, comprising:
   a non-pneumatic leg that is telescoping and adjustable in length and comprises two or more telescoping leg segments, wherein the leg is configured to extend in a pre-extended position prior to loading at a fixed length greater than the distance of the suspension system to the ground and sufficient to raise the tire off the ground when the leg is in a vertical position;
   a removable engagement member pivotably attached to the leg, wherein the removable engagement member can pivot with respect to the leg while attached to the leg;
   a mating engagement member including an attachment element configured to removably mate with the removable engagement member so that the removable engagement member and the non-pneumatic leg can be detached from the mating engagement member and wherein the mating engagement member is configured to attach to a suspension system of the ATV by way of said attachment element.

2. The ATV jack of claim 1, wherein the engagement member comprises a projection.

3. The ATV jack of claim 1, wherein the leg comprises an engagement surface for limiting the rotation of the engagement member in at least one direction.

4. The ATV jack of claim 3, wherein the leg member comprises an upper leg segment attached to the engagement member, at least one middle leg segment and a lower leg segment, and wherein at least one of the leg segments telescopes from one of the other leg segments.

5. The ATV jack of claim 4, wherein each leg segment comprises a plurality of holes and wherein the jack further comprises a plurality of pins configured to insert into the plurality of holes.

6. The ATV jack of claim 1, wherein the leg is attached to a base.

7. The ATV jack of claim 1, wherein the base comprises a flat base plate.

8. A non-pneumatic crankless fulcrum ATV jack for removably mounting to an ATV suspension system, comprising:
   a leg that is telescoping and adjustable in length and comprises two or more telescoping leg segments, wherein the leg is configured to extend in a pre-extended position prior to loading at a fixed length greater than the distance of the suspension system to the ground and sufficient to raise the tire off the ground when the leg is in a vertical position;
   a removable engagement member pivotably attached to the leg;
   a mating engagement member including an attachment element configured to removably mate with the removable engagement member and configured to attach to a suspension system of the ATV by way of said attachment element; and
   further comprising a safety lock system comprising a radial flange disposed around and near a proximal end of the engagement member and a safety collar having an opening configured to fit over the engagement member between the radial flange and the leg, thereby preventing the engagement member from pivoting and locking the engagement member in place.

9. The ATV jack system of claim 1, wherein a top portion of the leg comprises a flange having a single side opening configured to restrict the engagement member from pivoting greater than about 45 degrees.

10. An ATV jack system comprising the jack of claim 1, and further comprising at least one mounting bracket configured for attachment to the suspension system of an ATV.

11. The ATV jack system of claim 10, wherein the mounting bracket comprises a female receiving member configured to receive a portion of the engagement member.

12. A method for lifting an ATV having a suspension system using a non-pneumatic selecting providing an ATV jack having an engagement member and a telescoping adjustable length leg having a top leg and bottom leg portion, wherein the top leg portion is pivotably attached to the engagement member, wherein the leg is configured to extend in a pre-extended position prior to loading at a fixed length greater than the distance of the suspension system to the ground and sufficient to raise the tire off the ground when the leg is in a vertical position;

mating the engagement member with a removable mating engagement member configured to removably mate with the engagement member including an attachment element and configured to attach to a suspension system of the ATV by way of said attachment element, and wherein the mating engagement member is disposed on the suspension system of an ATV and disposing the leg at a downward angle so that the base plate bottom portion of the leg rests on the ground in the pre-extended position; and advancing the ATV toward the leg so that the leg moves toward vertical until the leg stops pivoting with respect to the engagement member; and wherein the method comprises inserting the engagement member into a mounting bracket attached to the suspension system.

13. The method of claim 12, wherein the suspension system includes a suspension arm and a shock absorber and wherein the mounting bracket is held to the suspension arm by a bolt which holds the shock absorber to the suspension arm.

14. The method of claim 1, wherein the leg telescopes and wherein the method further comprises further comprising the step of adjusting the leg's length prior to inserting the engagement member into the tube.

15. The method of claim 12, wherein the leg has a base attached thereto.

16. The method of claim 12, wherein the leg passes over vertical.

17. The method of claim 12, wherein advancing the ATV toward the leg loads the suspension system.

18. The method of claim 12, wherein the engagement member comprises a projection and the mating engagement member comprises a tube configured to receive the projection.

19. An ATV bracket for receiving a jack and supporting an ATV lifted by the jack, comprising a tube having an open end configured to receive a mating jack projection and a closed end configured to mount to a vehicle bolt, wherein the closed end comprises a hole configured to receive the vehicle bolt and retain the tube on the vehicle bolt.

* * * * *